United States Patent
Hammad

(10) Patent No.: US 10,552,828 B2
(45) Date of Patent: Feb. 4, 2020

(54) MULTIPLE TOKENIZATION FOR AUTHENTICATION

(71) Applicant: Visa International Service Association, San Francisco, CA (US)

(72) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 322 days.

(21) Appl. No.: 15/006,714

(22) Filed: Jan. 26, 2016

(65) Prior Publication Data

US 2016/0140542 A1 May 19, 2016

Related U.S. Application Data

(63) Continuation of application No. 13/443,737, filed on Apr. 10, 2012, now Pat. No. 9,280,765.

(Continued)

(51) Int. Cl.
  *G06Q 20/38* (2012.01)
  *G06Q 20/36* (2012.01)
  (Continued)

(52) U.S. Cl.
  CPC ......... *G06Q 20/3674* (2013.01); *G06Q 20/12* (2013.01); *G06Q 20/382* (2013.01);
  (Continued)

(58) Field of Classification Search
  USPC .............................. 705/1.1, 35, 38
  See application file for complete search history.

(56) References Cited

U.S. PATENT DOCUMENTS 4,849,613 A * 7/1989 Eisele .................. G06Q 20/341
  235/379
5,613,012 A 3/1997 Hoffman
  (Continued)

FOREIGN PATENT DOCUMENTS

EP  2156397 A1  2/2010
GB  2370475     6/2002
  (Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
  (Continued)

*Primary Examiner* — William E Rankins
(74) *Attorney, Agent, or Firm* — Kilpatrick Townsend & Stockton LLP

(57) ABSTRACT

Embodiments of the present invention are directed generally to systems, methods, and apparatuses for authenticating a cardholder using multiple tokenization authentication. Embodiments of the invention are directed at a method. The method includes receiving at a first entity a first token from a consumer and determining a second token associated with the first token. Once the second token is determined, the second token is sent to a server computer at a second entity. The server computer then determines an account identifier associated with the second token and processes a transaction using the account identifier.

18 Claims, 12 Drawing Sheets

Related U.S. Application Data

(60) Provisional application No. 61/474,084, filed on Apr. 11, 2011.

(51) Int. Cl.
*G06Q 20/12* (2012.01)
*G06Q 20/40* (2012.01)
*G06F 9/30* (2018.01)
*H04L 9/32* (2006.01)
*G06F 9/38* (2018.01)

(52) U.S. Cl.
CPC ........ *G06F 9/30196* (2013.01); *G06F 9/3822* (2013.01); *G06Q 20/385* (2013.01); *G06Q 20/3823* (2013.01); *G06Q 20/40* (2013.01); *G06Q 20/401* (2013.01); *G06Q 20/405* (2013.01); *H04L 9/32* (2013.01)

(56) References Cited

U.S. PATENT DOCUMENTS

| | | |
|---|---|---|
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,050,991 B2 | 11/2011 | Popovic et al. |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |

(56) References Cited

U.S. PATENT DOCUMENTS

| | | | |
|---|---|---|---|
| 8,412,623 B2 | 4/2013 | Moon | |
| 8,412,837 B1 | 4/2013 | Emigh | |
| 8,417,642 B2 | 4/2013 | Oren | |
| 8,447,699 B2 | 5/2013 | Batada | |
| 8,453,223 B2 | 5/2013 | Svigals | |
| 8,453,925 B2 | 6/2013 | Fisher | |
| 8,458,487 B1 | 6/2013 | Palgon | |
| 8,484,134 B2 | 7/2013 | Hobson | |
| 8,485,437 B2 | 7/2013 | Mullen | |
| 8,494,959 B2 | 7/2013 | Hathaway | |
| 8,498,908 B2 | 7/2013 | Mengerink | |
| 8,504,475 B2 | 8/2013 | Brand et al. | |
| 8,504,478 B2 | 8/2013 | Saunders | |
| 8,510,816 B2 | 8/2013 | Quach | |
| 8,433,116 B2 | 9/2013 | Davis et al. | |
| 8,533,860 B1 | 9/2013 | Grecia | |
| 8,538,845 B2 | 9/2013 | Liberty | |
| 8,555,079 B2 | 10/2013 | Shablygin | |
| 8,566,168 B1 | 10/2013 | Bierbaum | |
| 8,567,670 B2 | 10/2013 | Stanfield | |
| 8,571,939 B2 | 10/2013 | Lindsey | |
| 8,577,336 B2 | 11/2013 | Mechaley, Jr. | |
| 8,577,803 B2 | 11/2013 | Chatterjee | |
| 8,577,813 B2 | 11/2013 | Weiss | |
| 8,578,176 B2 | 11/2013 | Mattsson | |
| 8,583,494 B2 | 11/2013 | Fisher | |
| 8,584,251 B2 | 11/2013 | Mcguire | |
| 8,589,237 B2 | 11/2013 | Fisher | |
| 8,589,271 B2 | 11/2013 | Evans | |
| 8,589,291 B2 | 11/2013 | Carlson | |
| 8,595,098 B2 | 11/2013 | Starai | |
| 8,595,812 B2 | 11/2013 | Bomar | |
| 8,595,850 B2 | 11/2013 | Spies | |
| 8,606,638 B2 | 12/2013 | Dragt | |
| 8,606,700 B2 | 12/2013 | Carlson | |
| 8,606,720 B1 | 12/2013 | Baker | |
| 8,615,468 B2 | 12/2013 | Varadarajan | |
| 8,620,754 B2 | 12/2013 | Fisher | |
| 8,631,231 B2 | 1/2014 | Wentker et al. | |
| 8,635,157 B2 | 1/2014 | Smith | |
| 8,646,059 B1 | 2/2014 | Von Behren | |
| 8,651,374 B2 | 2/2014 | Brabson | |
| 8,656,180 B2 | 2/2014 | Shablygin | |
| 8,701,170 B1* | 4/2014 | Barber | H04L 63/08 726/7 |
| 8,751,391 B2 | 6/2014 | Freund | |
| 8,762,263 B2 | 6/2014 | Gauthier et al. | |
| 8,793,186 B2 | 7/2014 | Patterson | |
| 8,838,982 B2 | 9/2014 | Carlson et al. | |
| 8,856,539 B2 | 10/2014 | Weiss | |
| 8,887,308 B2 | 11/2014 | Grecia | |
| 9,065,643 B2 | 6/2015 | Hurry et al. | |
| 9,070,129 B2 | 6/2015 | Sheets et al. | |
| 9,100,826 B2 | 8/2015 | Weiss | |
| 9,160,741 B2 | 10/2015 | Wentker et al. | |
| 9,229,964 B2 | 1/2016 | Stevelinck | |
| 9,245,267 B2 | 1/2016 | Singh | |
| 9,249,241 B2 | 2/2016 | Dai et al. | |
| 9,256,871 B2 | 2/2016 | Anderson et al. | |
| 9,280,765 B2 | 3/2016 | Hammad | |
| 9,530,137 B2 | 12/2016 | Weiss | |
| 2001/0029485 A1 | 10/2001 | Brody | |
| 2001/0034720 A1 | 10/2001 | Armes | |
| 2001/0054003 A1 | 12/2001 | Chien | |
| 2002/0002538 A1* | 1/2002 | Ling | G06Q 20/04 705/41 |
| 2002/0007320 A1 | 1/2002 | Hogan | |
| 2002/0007351 A1* | 1/2002 | Hillegass | G06Q 20/06 705/59 |
| 2002/0016749 A1 | 2/2002 | Borecki | |
| 2002/0029193 A1 | 3/2002 | Ranjan | |
| 2002/0035548 A1 | 3/2002 | Hogan | |
| 2002/0073045 A1 | 6/2002 | Rubin | |
| 2002/0116341 A1 | 8/2002 | Hogan | |
| 2002/0133467 A1 | 9/2002 | Hobson | |
| 2002/0147913 A1 | 10/2002 | Lun Yip | |
| 2002/0152123 A1 | 10/2002 | Giordano | |
| 2003/0028481 A1 | 2/2003 | Flitcroft | |
| 2003/0130955 A1 | 7/2003 | Hawthorne | |
| 2003/0191709 A1 | 10/2003 | Elston | |
| 2003/0191945 A1 | 10/2003 | Keech | |
| 2004/0010462 A1 | 1/2004 | Moon | |
| 2004/0050928 A1 | 3/2004 | Bishop | |
| 2004/0059682 A1 | 3/2004 | Hasumi | |
| 2004/0093281 A1 | 5/2004 | Silverstein | |
| 2004/0117430 A1* | 6/2004 | Bazot | G06F 21/31 709/200 |
| 2004/0139008 A1 | 7/2004 | Mascavage | |
| 2004/0143532 A1 | 7/2004 | Lee | |
| 2004/0158532 A1 | 8/2004 | Breck | |
| 2004/0210449 A1 | 10/2004 | Breck | |
| 2004/0210498 A1 | 10/2004 | Freund | |
| 2004/0232225 A1 | 11/2004 | Bishop | |
| 2004/0260646 A1 | 12/2004 | Berardi | |
| 2005/0037735 A1 | 2/2005 | Coutts | |
| 2005/0080730 A1 | 4/2005 | Sorrentino | |
| 2005/0108178 A1 | 5/2005 | York | |
| 2005/0199709 A1 | 9/2005 | Linlor | |
| 2005/0246293 A1 | 11/2005 | Ong | |
| 2005/0269401 A1 | 12/2005 | Spitzer | |
| 2005/0269402 A1 | 12/2005 | Spitzer | |
| 2006/0206517 A1* | 9/2006 | Hyder | G06Q 30/02 |
| 2006/0235795 A1 | 10/2006 | Johnson | |
| 2006/0237528 A1 | 10/2006 | Bishop | |
| 2006/0278704 A1 | 12/2006 | Saunders | |
| 2007/0107044 A1 | 5/2007 | Yuen | |
| 2007/0129955 A1 | 6/2007 | Dalmia | |
| 2007/0136193 A1 | 6/2007 | Starr | |
| 2007/0136211 A1 | 6/2007 | Brown | |
| 2007/0143227 A1 | 6/2007 | Kranzley | |
| 2007/0170247 A1 | 7/2007 | Friedman | |
| 2007/0179885 A1 | 8/2007 | Bird | |
| 2007/0208671 A1 | 9/2007 | Brown | |
| 2007/0245414 A1 | 10/2007 | Chan | |
| 2007/0271179 A1* | 11/2007 | Kubota | G06Q 20/02 705/39 |
| 2007/0288377 A1 | 12/2007 | Shaked | |
| 2007/0291995 A1 | 12/2007 | Rivera | |
| 2008/0015988 A1 | 1/2008 | Brown | |
| 2008/0029607 A1 | 2/2008 | Mullen | |
| 2008/0035738 A1 | 2/2008 | Mullen | |
| 2008/0052226 A1 | 2/2008 | Agarwal | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065554 A1 | 3/2008 | Hogan | |
| 2008/0065555 A1 | 3/2008 | Mullen | |
| 2008/0201264 A1 | 8/2008 | Brown | |
| 2008/0201265 A1 | 8/2008 | Hewton | |
| 2008/0228646 A1 | 9/2008 | Myers | |
| 2008/0243702 A1 | 10/2008 | Hart | |
| 2008/0245855 A1 | 10/2008 | Fein | |
| 2008/0245861 A1 | 10/2008 | Fein | |
| 2008/0283591 A1 | 11/2008 | Oder, II | |
| 2008/0302869 A1 | 12/2008 | Mullen | |
| 2008/0302876 A1 | 12/2008 | Mullen | |
| 2008/0313264 A1 | 12/2008 | Pestoni | |
| 2009/0006262 A1 | 1/2009 | Brown | |
| 2009/0010488 A1 | 1/2009 | Matsuoka | |
| 2009/0037333 A1 | 2/2009 | Flitcroft | |
| 2009/0037388 A1 | 2/2009 | Cooper | |
| 2009/0037982 A1 | 2/2009 | Wentker et al. | |
| 2009/0043702 A1 | 2/2009 | Bennett | |
| 2009/0048971 A1 | 2/2009 | Hathaway | |
| 2009/0070171 A1* | 3/2009 | Patterson | G06Q 20/108 705/75 |
| 2009/0106112 A1 | 4/2009 | Dalmia | |
| 2009/0106160 A1 | 4/2009 | Skowronek | |
| 2009/0134217 A1 | 5/2009 | Flitcroft | |
| 2009/0157555 A1 | 6/2009 | Biffle | |
| 2009/0159673 A1 | 6/2009 | Mullen | |
| 2009/0159700 A1 | 6/2009 | Mullen | |
| 2009/0159707 A1 | 6/2009 | Mullen | |
| 2009/0173782 A1 | 7/2009 | Muscato | |

(56) References Cited

U.S. PATENT DOCUMENTS

| | | |
|---|---|---|
| 2009/0192944 A1 | 7/2009 | Sidman et al. |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0020946 A1 | 1/2010 | Jackson |
| 2010/0063895 A1 | 3/2010 | Dominguez |
| 2010/0065629 A1 | 3/2010 | Wentker |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0179907 A1* | 7/2010 | Atkinson ............... G06Q 20/10 705/44 |
| 2010/0185545 A1 | 7/2010 | Royyuru |
| 2010/0211505 A1 | 8/2010 | Saunders |
| 2010/0217709 A1* | 8/2010 | Aabye ................... G06Q 20/10 705/44 |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306048 A1* | 12/2010 | Corduneanu .......... G06Q 30/02 705/14.45 |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0145899 A1* | 6/2011 | Cao ....................... H04L 9/3213 726/7 |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0208658 A1* | 8/2011 | Makhotin ................. G06F 21/34 705/75 |
| 2011/0238473 A1 | 9/2011 | Sankolli et al. |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0313921 A1* | 12/2011 | Dheer .................... G06Q 20/10 705/42 |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0166334 A1* | 6/2012 | Kimberg ............... G06Q 20/227 705/44 |
| 2012/0173431 A1 | 7/2012 | Ritchie |
| 2012/0185386 A1 | 7/2012 | Salama |
| 2012/0191611 A1* | 7/2012 | Kelly ................... G06Q 20/382 705/64 |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0046696 A1 | 2/2013 | Radhakrishnan |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |

(56) References Cited

U.S. PATENT DOCUMENTS

| | | |
|---|---|---|
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0143144 A1* | 5/2014 | DuCharme ........ G06Q 20/3821 705/44 |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| KR | 10-2011-0006736 A | 1/2011 |
| WO | 2001/018720 A1 | 3/2001 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | WO2007126552 A1 | 11/2007 |
| WO | 2009/032523 A1 | 3/2009 |
| WO | 2009032523 A1 | 3/2009 |
| WO | 2010/078522 A1 | 7/2010 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

International Search Report and Written Opinion in PCT Application PCT/US2012/032931, dated Oct. 30, 2012.

(56) References Cited

OTHER PUBLICATIONS

U.S. Appl. No. 61/347,962, filed May 25, 2010, 13 pages.
Wang, U.S. Appl. No. 62/000,288 (unpublished), Payment System Canonical Address Format filed on May 19, 2014.
Sharma et al., U.S. Appl. No. 62/003,717 (unpublished), Mobile Merchant Application filed on May 28, 2014.
Kalgi et al., U.S. Appl. No. 62/024,426, (unpublished) Secure Transactions Using Mobile Devices filed on Jul. 14, 2014.
Prakash et al., U.S. Appl. No. 62/037,033 (unpublished), Sharing Payment Token filed on Aug. 13, 2014.
Hoverson et al., U.S. Appl. No. 62/038,174 (unpublished), Customized Payment Gateway filed on Aug. 15, 2014.
Wang, U.S. Appl. No. 62/042,050 (unpublished), Payment Device Authentication and Authorization System filed on Aug. 26, 2014.
Gaddam et al., U.S. Appl. No. 62/053,736 (unpublished), Completing Transactions Without a User Payment Device filed on Sep. 22, 2014.
Patterson, U.S. Appl. No. 62/054,346 (unpublished), Mirrored Token Vault filed on Sep. 23, 2014.
Dimmick, U.S. Appl. No. 14/952,514 (unpublished), Systems Communications With Non-Sensitive Identifiers filed on Nov. 25, 2015.
Dimmick, U.S. Appl. No. 14/952,444 (unpublished), Tokenization Request Via Access Device filed on Nov. 25, 2015.
Prakash et al., U.S. Appl. No. 14/955,716 (unpublished), Provisioning Platform for Machine-To-Machine Devices filed on Dec. 1, 2015.
Wong et al., U.S. Appl. No. 14/966,948 (unpublished), Automated Access Data Provisioning filed on Dec. 11, 2015.
Stubbs et al., U.S. Appl. No. 62/103,522 (unpublished), Methods and Systems for Wallet Provider Provisioning filed on Jan. 14, 2015.
McGuire, U.S. Appl. No. 14/600,523 (unpublished), Secure Payment Processing Using Authorization Request filed on Jan. 20, 2015.
Flurscheim et al., U.S. Appl. No. 15/004,705 (unpublished), Cloud-Based Transactions With Magnetic Secure Transmission filed on Jan. 22, 2016.
Flurscheim et al., U.S. Appl. No. 62/108,403 (unpublished), Wearables With NFC HCE filed on Jan. 27, 2015.
Sabba et al., U.S. Appl. No. 15/011,366 (unpublished), Token Check Offline filed on Jan. 29, 2016.
Patterson, U.S. Appl. No. 15/019,157 (unpublished), Token Processing Utilizing Multiple Authorizations filed on Feb. 9, 2016.
Cash et al., U.S. Appl. No. 15/041,495 (unpublished), Peer Forward Authorization of Digital Requests filed on Feb. 11, 2016.
Le Saint et al., U.S. Appl. No. 15/008,388 (unpublished), Methods for Secure Credential Provisioning filed on Jan. 27, 2016.
Kinagi, U.S. Appl. No. 62/117,291 (unpublished), Token and Cryptogram Using Transaction Specific Information filed on Feb. 17, 2015.
Galland et al. U.S. Appl. No. 62/128,709 (unpublished), Tokenizing Transaction Amounts filed on Mar. 5, 2015.
Rangarajan et al., U.S. Appl. No. 61/751,763 (unpublished), Payments Bridge filed on Jan. 11, 2013.
Li, U.S. Appl. No. 61/894,749 (unpublished), Methods and Systems for Authentication and Issuance of Tokens in a Secure Environment filed on Oct. 23, 2013.
Aissi et al., U.S. Appl. No. 61/738,832 (unpublished), Management of Sensitive Data filed on Dec. 18, 2012.
Wong et al., U.S. Appl. No. 61/879,362 (unpublished), Systems and Methods for Managing Mobile Cardholder Verification Methods filed on Sep. 18, 2013.
Powell, U.S. Appl. No. 61/892,407 (unpublished), Issuer Over-The-Air Update Method and System filed on Oct. 17, 2013.
Powell, U.S. Appl. No. 61/926,236 (unpublished), Methods and Systems for Provisioning Mobile Devices With Payment Credentials and Payment Token Identifiers filed on Jan. 10, 2014.

* cited by examiner

MULTIPLE TOKENIZATION FOR AUTHENTICATION

CROSS-REFERENCES TO RELATED APPLICATIONS

This application is a continuation application of U.S. patent application Ser. No. 13/443,737, filed Apr. 10, 2012, which claims the benefit of U.S. Provisional Application No. 61/474,084, filed Apr. 11, 2011, titled "DOUBLE TOKENIZATION FOR AUTHENTICATING A CARDHOLDER," the disclosures of which are hereby incorporated by reference in their entirety for all purposes.

BACKGROUND

Data theft due to hacking, viruses, and malicious software is a serious problem in the our digital information society. Data breaches of secure databases containing consumer information are a regular occurrence. Merchants store vast databases of sensitive account and personal information for financial related purposes. Hackers interested in identify theft have found these merchant databases to be easy targets. Security breaches at merchants and other entities have led to countless unauthorized transactions being completed using consumers account information. This problem may be compounded by small business merchants that do not have the resources to secure their data against sophisticated hackers. Accordingly, merchants may store sensitive information about their consumers that may cause the merchant to be liable if the information is stolen and used to complete unauthorized transactions.

Additionally, some owners and/or employees of a merchant may also access sensitive consumer information from the vast records of sensitive data and use information from the databases to initiate unauthorized transactions at other merchants. Because no data is breached during an attack from an outside entity, many times no one may know that the consumer's information has been stolen or when it was stolen. Accordingly, malicious merchants with access to sensitive information may open the consumer to loss through fraudulent transactions. Because no particular merchant may be traceable to the data breach, it may be hard to find the appropriate merchant responsible and thus the consumer may bear the liability for the unauthorized transaction.

Additionally, as payment transactions using accounts associated with portable consumer devices become more prevalent, consumers demand more flexible payment options. One solution may be to allow consumers to use personal information to initiate transactions. However, allowing consumers to initiate transactions with the use of personal information makes the personal information more sensitive data because third parties may use the personal information to initiate unauthorized transactions. Furthermore, personal information related to the consumer may be easier for malicious parties to gain access to then account passwords, personal identification numbers, and other such authentication techniques used in the past. For example, if consumers are allowed to initiate a transaction by merely providing their phone number, the ability for third parties to initiate unauthorized transactions by merely submitting a phone number that can be found in a phone book increases the chances of an unauthorized transaction being initiated astronomically. Accordingly, as personal information that used to be non-sensitive are becoming more sensitive as it is being used to initiate payment transactions. Therefore, a need exists to protect the consumers personal information from being stored in merchant records, while providing more flexible payment options.

Consumers are constantly in need of access to their payment accounts no matter what circumstances they find themselves in. For example, a consumer may have misplaced or lost their portable consumer device. As such, there exists a need for authentication procedures that are both secure as well as consumer friendly. Consumer friendly authentication means that the consumer may use information that is recognizable, relevant, and easily remembered to initiate a transaction. Furthermore, it may mean that transactions may be initiated without the need for a device to be carried or swiped.

However, the use of tokens that are recognizable, easy to remember, and familiar to consumers can also be easily overheard, sniffed, or otherwise compromised by a third party. Once a consumers information is compromised it is possible to use it at different merchants. Accordingly, there is a need for a simple, flexible, and mobile form of payment that is also secure from interception from third parties and use at multiple merchants.

Furthermore, consumers use their sensitive data with so many different merchants that it may be difficult to keep their sensitive or personal information secure. Many consumers ask consumers for their personal information as a matter of course during transactions presently. Accordingly, there is a need for an authentication system that can be implemented at individual merchants where any tokens used in the authentication may not be relevant or usable by other merchants.

Storing consumer financial and personal information at a merchant uses a vast amount of system resources and may leave the merchant liable for any data breaches. Furthermore, merchant attempts to secure this sensitive information uses further system resources and for small entities with limited budgets, appropriate security may not be feasible. Accordingly, there is a need to design an authentication technique that is secure, flexible, and does not require the storing of sensitive consumer information.

Embodiments of the present invention address these problems and other problems individually and collectively.

BRIEF SUMMARY

Embodiments of the present invention are directed generally to techniques for authenticating a cardholder using multiple tokenization authentication.

One embodiment of the invention is directed at a method. The method includes receiving at a first entity a first token from a consumer and determining a second token associated with the first token. Once the second token is determined, the second token is sent to a server computer at a second entity. The server computer then determines an account identifier associated with the second token and processes a transaction using the account identifier.

In some embodiments, the second token may be determined by electronically searching a second token database for a second token associated with the first token. The second token may be derived from a first entity identifier. The second entity may use a predetermined algorithm to determine the account identifier associated with the second token.

In some embodiments, the second token may be determined by electronically searching a database to determine a second token associated with the first token. The second token may then be sent to the server computer by generating an authorization request message including the second token. The authorization request message may then be sent to the server computer at the second entity. The server computer may receive the authorization request message and determine the account identifier by electronically searching a database for an account identifier associated with the second token. The server computer may then modify the authorization request message to include the account identifier and send the modified authorization request message to an account issuer computer for processing.

Some embodiments of the invention may further include receiving during a transaction at a merchant a first token and a consumer identifier from a consumer. The merchant determines whether the first token is associated with the consumer identifier. If the first token is associated with the consumer identifier, the merchant determines a second token associated with the consumer identifier. The second token is sent to the payment processing network. The payment processing network determines an account number associated with the second token and processes the transaction using the account number.

Another embodiment of the technology is directed at an apparatus. The apparatus may include a processor and a non-transitory computer-readable storage medium coupled to the processor. The computer-readable storage medium may comprise code executable by the processor for implementing a method. The method may comprise receiving a first token from a consumer and determining a second token associated with the first token. The method may then include sending the second token to a server computer at a second entity. The server computer may determine an account identifier associated with the second token. The server computer may then process a transaction using the account identifier.

Another embodiment of the invention is directed at a method. The method may include receiving a second token at a second entity from a first entity. The second token may be associated with a first token that is received by the first entity from a consumer. The second entity may also determine an account identifier associated with the second token and process a transaction using the account identifier.

Another embodiment of the invention is directed at an apparatus. The apparatus may include a processor and a non-transitory computer-readable storage medium coupled to the processor. The computer-readable storage medium may comprise code executable by the processor for implementing a method. The method may include receiving a second token from a first entity, wherein the second token is associated with a first token that is received by the first entity from a consumer. The method may further include determining an account identifier associated with the second token and processing a transaction using the account identifier.

These and other embodiments of the invention are described in further detail below.

DETAILED DESCRIPTION

Figure 1:
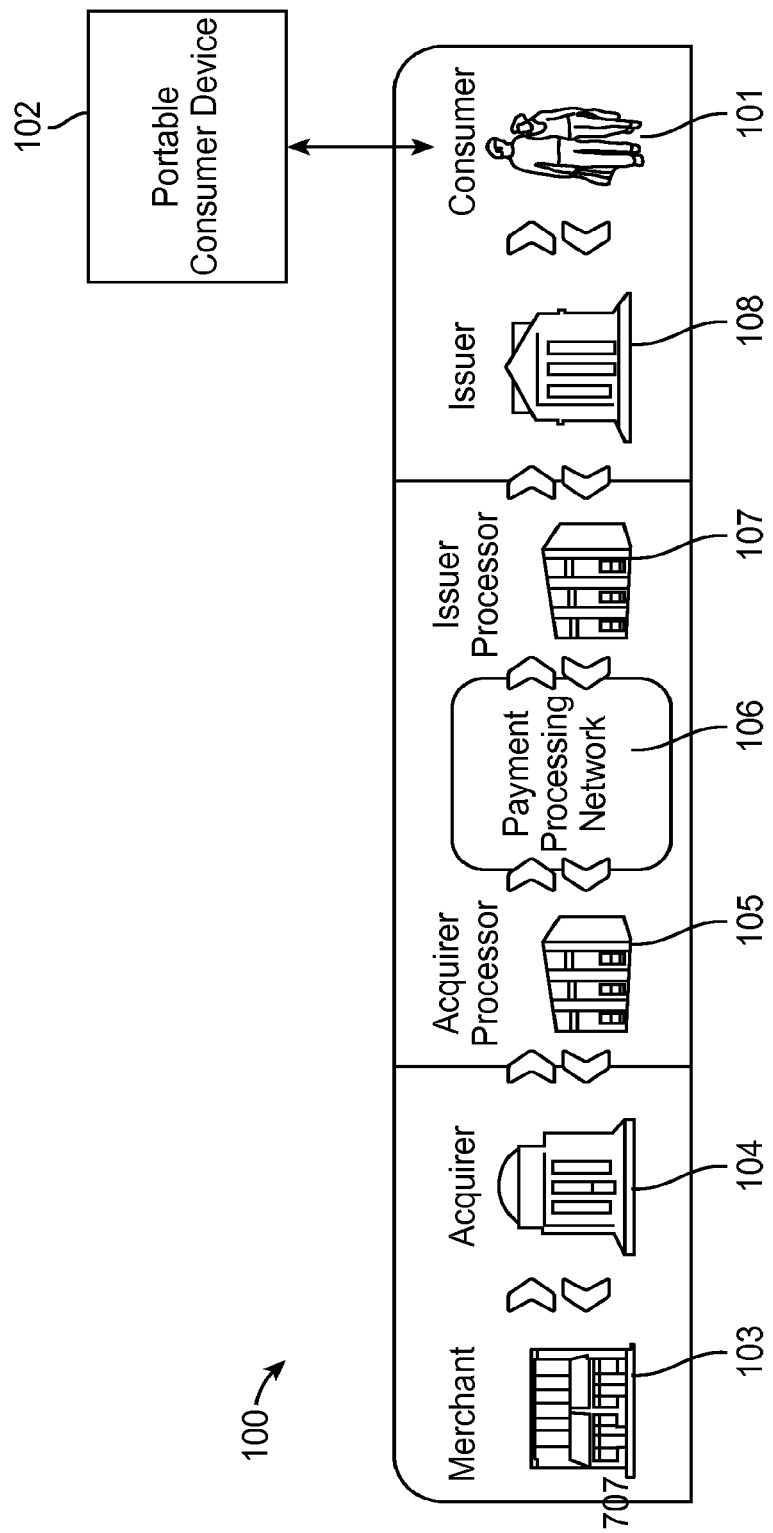
FIG. 1 depicts a block diagram of a transaction processing system.

Embodiments disclosed herein are directed to techniques for authenticating a user using a multiple tokenization process. A token can be any information that can be used to authenticate the identity of the cardholder. In one embodiment, when a consumer initiates a financial transaction at a merchant, instead of providing account information for a payment account of the consumer, the consumer may provide a first token. The first token may include personal information that is requested by the merchant. The personal information may include, for example, a phone number, billing address, email address, or any other personal information. A computer at the merchant may receive the first token and may generate a second token by altering the information contained in the first token. The second token may also include a first entity identifier that identifies the first entity to the second entity and allows the second entity to determine the appropriate predetermined algorithm to use when determining recognizable data from the second token.

As an illustration, the first token could include the phone number and zip code of the consumer and the second token could be generated by using the last four digits of the zip code and the last four digits of the phone number combined according to a predetermined algorithm. The second token could look like a random alphanumeric data stream made up of 16 digits, 4111-220A-4158-2041. However, within this data stream is a payment processing network indicator (4), the first three digits of the consumer's phone number (111), a second entity identifier (220A), the last four digits of the consumer's zip code (4158), last three digits of the consumer's phone number (204), and finally, a check sum digit (1)

that informs the payment processing system that the data is not flawed. The second entity could then generate recognizable data including a large portion of the consumer's phone number (xxx-111-x204) and a large portion of the consumer's zip code (x4158). Using this recognizable data, the system could search for an account identifier that is associated with a registered consumer with that phone number and zip code. If the system found a suitable account identifier, the system could process the transaction as a typical transaction using the account identifier instead of the second token. In this manner, merchants do not have to store any sensitive information and the consumer can initiate a transaction without using their account information.

In another embodiment, when a consumer initiates a financial transaction at a merchant, instead of providing account information for a payment account of the consumer, the consumer can instead provide the merchant with a first token. The first token can include information that is less sensitive than, e.g., the consumer's primary account number (PAN). For example, the first token can be the name of the consumer's pet. The merchant can look up a second token associated with the consumer identifier and provide the second token to a payment processing network associated with the payment account. The second token can be also be less sensitive that, e.g., the consumer's PAN. However, in one embodiment, the second token can be more sensitive than the first token. For example, the second token can be the consumer's mobile phone number. The second token can be sent to the payment processing network via the merchant's acquirer within an authorization request message. The payment processing network can use the second token to access the corresponding PAN. Once the PAN is determined, the payment processing network can modify the authorization request message to include the PAN. The modified authorization request message including the PAN is then sent to the consumer's issuer for authorization of payment. From this point, a typical payment authorization process can be performed.

The multiple tokenization authentication processes described herein are advantageous because the merchant does not have to store any sensitive information whose theft may subject the merchant to liability for any unauthorized charges as a result of the theft. Additionally, some embodiments may allow the merchant to avoid saving any personal information related to the consumer whatsoever. Furthermore, some embodiments of the multiple tokenization authentication do not require the consumer to provide account information to the merchant, thereby preventing misuse of the consumer's payment account by a malicious owner or employee. Also, the multiple tokenization authentication process allows the consumer to make a purchase by simply providing a non-physical token eliminating the need for the consumer to carry a consumer device. The multiple tokenization authentication systems and methods will be described in more detail below.

Prior to discussing the specific embodiments of the invention, a further description of some terms can be provided for a better understanding of embodiments of the invention.

A "first token" may be any data input into an electronic device, which can be used to authenticate a user. The first token may comprise a word, a combination of words, a collection of alphanumeric characters, a biometric input (e.g. a fingerprint, eye scan, voice recognition, etc.), or any other repeatable information that has been provided during registration with an entity and can be used to authenticate a consumer. For example, the first token could be as simple as the name of the consumer's favorite pet, the name of the consumer's family member, or the name of the consumer's favorite color. On the other hand, the token could be as complex as an output from a voice recognition program that recognizes a consumer's voice or the digital signature of a consumer's voice saying a predetermined or random statement. Furthermore, the first token may represent sensitive data, such as an account number, CVV number, expiration date, etc., or the first token may represent non-sensitive data, such as a name, date of birth, or unrecognizable collections of sensitive information that when combined, make the information not sensitive. Additionally, the tokens may be provided through the swipe of a portable consumer device, through near field communications elements in a wireless device, or by a consumer or other person physically entering the data into an access device.

The first token may be any input into an electronic device by a consumer that is received at a first entity. The first token may be input by the consumer directly or may be input by another party at the direction of the consumer. For example, the first token could be told to a cashier and the cashier could enter the token into an access device. The first token may be the same for the consumer over multiple merchants or may be different for every merchant. In some embodiments, the first token may be repeatable and include personal information that allows identification of the consumer. For example, the first token may comprise the combination of a phone number and a zip code such that the first entity can determine the identity of the consumer that matches consumer registration information. Depending on the embodiment of the multiple tokenization authentication process being implemented, the first token may include large amounts of data that may be sensitive or small amounts of data that are not particularly sensitive.

In some embodiments, the first token may be a non-sensitive word or input that may not be related to the transaction at all. According to this embodiment, the first token can include information associated with the consumer that is less sensitive than, e.g. the consumer's primary account number for the payment account. For example, the first token can include information such as a pet's name, a mother's maiden name, the first street on which the consumer lived, a childhood nickname, a best friend's name, a name of the consumer's high school, a word or phrase arbitrarily chosen by the consumer, an email address of the consumer, a work password, etc. In this embodiment, the first token may be maintained in secrecy such that others would not know the first token associated with the consumer at the merchant. However, if the first token was disclosed to a third party, the first token could be used by the third party to initiate unauthorized transactions at the merchant. Therefore, in such embodiments, it may be beneficial to validate the token with a consumer identifier as well. The consumer identifier could include any suitable information that could be provided by a consumer. The consumer identifier could be input in any suitable manner (e.g. through a swipe of a card, by consumer input into an access device, or through a portable consumer device, etc.).

Additionally, the first token may be recognizable or unrecognizable. For example, names, addresses, and certain collections of numbers (e.g. years, dates, etc.) may be easily recognizable by an observer. As such, it may be possible to implement a first token that is not easily recognizable by combining pieces of information or alphanumeric characters in a manner that a person may not easily remember the first token if someone hears or otherwise gains access to the first token.

A "second token" may be any information that is stored or generated by a first entity. The second token may be repeatable, modifiable, and transferable such that it may be transferred to a second entity through any suitable method. The second token may be associated with the first token. For example, the second token may be generated by altering information from the first token. Information from the first token may be altered in any suitable manner. For example, the second token may be a "hash" of the first token. Hashing may be accomplished by separating and combining portions of information provided in the first token according to a known algorithm or hashing scheme. For example, if a consumer provided their billing address, phone number, and date of birth in a first token, the second token could be created by taking the first three digits of the phone number, the month of the consumer's birth, and the zip code of the billing address to make a second token that is of a predetermined length. The second token could then be decrypted by using the predetermined algorithm to convert the second token back into consumer information comprised in the first token.

The second token could also comprise other data not related to the information in the first token as well so that the multiple tokenization authentication process could be implemented on existing infrastructure. The other data not related to the first token could include a first entity identifier, which could be unique for every entity, and would inform the second entity who generated the second token. Additionally, the second token could be in the format of a payment card number. The payment card number format could include a payment processing network indicator and a check sum digit. Current payment processing systems may require a payment process network indicator field that informs an acquirer of which payment processing network services the type of payment device being used. Additionally, a check sum digit could be added to the second token so that current systems would know the data has not been corrupted. Accordingly, the multiple tokenization authentication process could be implemented using existing infrastructure without requiring upgrades.

Additionally, the second token could comprise binary or alphanumeric data characters and could be any length or format. For example, the second token could be generated in a manner that it could be used in preexisting systems that require data of a specific length or format. The second token could include the required processing information described above and then use the information of the first token to fill in the available data element positions that are available. For example, using the example above, the second token could include a payment processing network indicator, a check sum digit, 4 data elements corresponding to a first entity identifier, 3 data elements corresponding to the last three digits of the zip code, 4 data elements corresponding to the home address street number, and 2 data elements corresponding to the month of the consumer's birth to generate a second token of 15 data elements long. If the transaction system typically used payment card numbers of 16 or 19 data elements, the additional data elements could be padded with ones or zeros as well to fill the available data elements. The second token could then be used in an existing payment processing network without requiring infrastructure upgrades. Additionally, the first and second entity could implement both multiple tokenization authentication transactions as well as typical transactions on the same equipment. This second token could then be included in a typical transaction message on the transaction system and the multiple tokenization authentication process could be implemented using preexisting systems. Any other suitable and repeatable process for altering or using information in the first token that allows a second entity to determine the original information from the second token could be used.

In some embodiments, the second token is not related to the first token and instead is separate information associated with the first token. For example, information could be stored during a registration period that associates a secret first token (e.g. the consumer's dog's name, "Spike"), to a consumer's phone number. The first token would be spike and the second token would be the consumer's phone number. When the first entity receives the first token, the first entity may electronically search a database of associated second tokens and may find that the consumer's phone number is associated with the secret first token Spike. Accordingly, the two tokens are separate information but they are associated through a registration process and have stored relationships at the first entity.

A "first entity" may be any party that interacts with a consumer in a transaction. The identity of the first entity may depend on the type of transaction occurring. For example, in a consumer purchase transaction, the first entity may be a merchant. However, if the merchant were using a third party to accomplish their billing, the first entity may be a billing entity. In either case, the first entity may communicate with a consumer directly or indirectly with the purpose of accomplishing a transaction. The first entity may also be part of a larger payment system with multiple entities. For example, entities in the payment system may include a merchant, an acquirer, a payment processing network, and an issuer. Other entities may also be included as one of ordinary skill in the art would recognize. The first entity may communicate with each and every other entity in the transaction system either directly or through other entities relaying messages between one another. For example, a merchant may communicate with a payment processing network through an acquirer. The first entity may comprise a server computer, as described in further detail below, or any other equipment that one or ordinary skill in the art would recognize as necessary for communication as well as other purposes. The first entity may also perform other duties outside of communication and multiple token authentication as one or ordinary skill in the art would recognize.

A "second entity" may be any party that interacts with the first entity in a transaction. For example, the second entity may be an acquirer. In some embodiments the second entity may comprise a payment processing network. The second entity may be any entity that is capable of communicating with the first entity and may be capable of determining an account identifier associated with a second token. The second entity is similar to the first entity in that it may comprise a server computer and one or more databases with the capability to communicate between parties as well as accomplish features and functions outside of the multiple tokenization authentication procedure described herein.

A "merchant" may be any entity that offers a service or product to another entity, typically a consumer or business. The merchant typically has one or more server or other computers that send and receive messages between parties and perform necessary functions for accomplishing the processing of a transaction. The merchant may also have an access device whereby the merchant receives information input from the consumer. Furthermore, the merchant may have other specialized equipment to receive data through a portable consumer device including near field communication methods.

An "acquirer" may be a business entity (e.g., a commercial bank) that has a business relationship with a particular merchant. The acquirer typically has one or more server or other computers that send and receive messages between parties and perform necessary functions for accomplishing the processing of a transaction.

An "Issuer" is typically a computer at a business entity (e.g., a bank) which issues a payment device (such as a credit or debit card) to a consumer. The issuer typically has one or more server or other computers that send and receive messages between parties and perform necessary functions for accomplishing the processing of a transaction. Some entities may perform both issuer computer and acquirer computer functions and those entities would have a computer that could implement both functions.

A "transaction" can refer to any interaction between one or more parties capable of communicating transaction details. These parties may include persons, businesses, corporations, organizations, or any other entities capable of performing obligations and agreements. The transaction may include an exchange of monetary value or merely the exchange of obligations or information. The transaction may occur through any suitable manner as described below and recognized by one of ordinary skill in the art. The transaction may occur in person, meaning both parties or party representatives are interacting in the same physical location, or the transaction may occur between parties that are remote from one another. Additionally, a transaction may be unilateral, meaning only one party is initiating or participating in the transaction, or bilateral, meaning there are two active parties. For example, in one embodiment, a single consumer can initiate a payment to a party that is not aware of the payment until the transaction has occurred. Such a case may involve an online bank account transfer to another party who is unaware of the transaction before the payment appears in their account.

An "account identifier" may be any information or data that identifies an account being held by an account issuer. The account identifier may be a typical account number or may be any other collection of data that identifies an account being held by a consumer. Depending on how the account issuer identifies their accounts, the account identifier could be any collection of data capable of identifying a financial or other account at an issuer (e.g. primary account number, social security number, full name, etc.). The account identifier may be stored at the second entity in an encrypted manner such that it is secure even if third parties gain access to the data.

"Processing a transaction" may be any number of steps or functions necessary to accomplish a transaction. For example, in a typical payment transaction system, processing a transaction may include authorizing a payment transaction with an account issuer. Typically, an electronic payment transaction is authorized if the consumer conducting the transaction is properly authenticated (i.e., their identity and their valid use of a payment account is verified) and if the consumer has sufficient funds or credit to conduct the transaction. These actions may be accomplished through any number of steps and using any number of entities as one or ordinary skill in the art would recognize.

A "first entity identifier" may be an identifier for a first entity. It may be transmitted along with the second token to the second entity. The first entity identifier may be part of the second token or may be sent along with the second token in the same message. The second entity may use the first entity identifier to determine the account identifier associated with the second token. The second entity may recognize the first entity identifier as part of the second token by the location of the data in the second token or the message the second token is transmitted in. For example, the fourth data position of the second token through the eighth data position of the second token may always comprise the first entity identifier in one implementation of the multiple tokenization authentication. Therefore, the second entity may determine the first entity identifier by extracting the data corresponding to these data positions. The second entity may then determine the identity of the first entity by comparing the first entity identifier to a list of first entities in a first entity identifier database.

Because the system may be implemented on an existing transaction system, not all first entities may be participating in a multiple tokenization authentication process. As such, the second entity may use the second entity identifier to determine whether the second entity is participating in the multiple tokenization authentication process. For example, if the second entity recognizes the data contained in the pre-assigned data location for the first entity identifier as belonging to a first entity that is participating in the multiple tokenization authentication process, then the second entity may process the transaction message using multiple tokenization procedures as described herein. However, if the first entity identifier extracted from the data stream or message does not correspond to a first entity identifier or the first entity identifier that it corresponds to does not participate in the multiple tokenization authentication procedure, then the second entity may process the transaction as a typical transaction without using multiple tokenization.

A "predetermined algorithm" may be any method of altering data that can be shared between multiple entities. Suitable algorithms may include encryption and hashing algorithms. The predetermined algorithm may be used to alter the data as well as deconstruct the method by which the data was altered. As such, the predetermined algorithm is used to generate the second token and is used to convert the second token into one or more recognizable values. For example, if a hash is used to alter the data, the predetermined algorithm would indicate which digits are generated from which input data. In this manner, a party that knows the predetermined algorithm can reconstruct the original input data while a party without this data has no means for determining what the information means. For instance, using the example described above, the predetermined algorithm may inform the first entity how to generate and the second entity how to convert the hashed second token by informing the entities what data corresponds to each bit or byte in the second token. The first entity would use the predetermined algorithm to generate the hashed second token by applying the predetermined algorithm to the input first token to generate the second token. The second entity would use the predetermined algorithm to convert the second token into a recognizable value that corresponds to some consumer personal information or other information provided by the consumer during a registration phase. The consumer information obtained during the registration phase may be associated with information included in the first token. Because each entity may have a different predetermined algorithm, the first entity identifier may also be used by the second entity to determine which predetermined algorithm to use when converting the second token. The second entity may use the predetermined algorithm to interpret the second token by looking up the predetermined algorithm that corresponds to the first entity identifier in a predetermined algorithm database.

A "recognizable value" may be any value that has meaning for the second entity. The recognizable value may be associated with the first token. This association may arise from a stored value in a database located at the second entity that corresponds to the recognizable value in part or in entirety. In such a case, the recognizable value may be used to electronically search a consumer account database for the account identifier. For example, a first token may include a portion of a phone number of a consumer. The second token may be generated by hashing portions of the phone number according to a predetermined algorithm. The second entity may use the predetermined algorithm to determine the portions of the phone number included in the second token. Accordingly, the recognizable value may be a portion of the phone number that is associated with the first token.

The recognizable value may be determined using the predetermined algorithm. The second entity may apply the predetermined algorithm to the second token in a manner that decrypts or converts the data into meaningful and recognizable information that can be used to associate the data to an account identifier. For example, the recognizable value may be the last four digits of the phone number that is extracted from the second token and those last four digits may be used by the second entity to determine the identity of the account holder and a corresponding account identifier for the account belonging to the account holder. Additionally, in some embodiments, no conversion is required to determine a recognizable value because the second token may be a recognizable value that is stored in a database at the second entity. For example, the second token could be the recognizable value (a consumer's phone number) used to find an associated consumer account identifier in the consumer account database. In this case, the predetermined algorithm may inform the server computer that the second token is a phone number or there may not be a predetermined algorithm at all.

A "payment card number" may be any information that identifies a card used during a payment transaction. Payment card numbers may be examples of account identifiers. The card is associated with an account number or other identifier determined by an issuer that identifies the consumer and/or the account held by the consumer such that transactions can be accomplished using the account. The payment card number may comprise a series of numbers or alphanumeric characters that identify an account in a typical transaction system. The payment card number may typically be used to identify an account during a transaction. The payment card number's length may be different depending on the payment processing network and/or card issuer. Furthermore, as explained above, the payment card number may comprise a payment processing network indicator as well as a check sum digit.

A "payment processing network indicator" may be any information field in a second token (or message comprising a second token) that informs an acquirer which payment processing network to route the transaction to. The information field may be any suitable data that can be implemented in a message or data stream. For example, the payment processing network indicator may be a simple as a binary digit or could be as complex as a word, alphanumeric stream of data, etc. For example, a payment processing network indicator for a transaction originated with a portable consumer device using a first payment processing network may be included in a message sent to an acquirer such that the data stream starts with an alphanumeric digit "4," while transactions originated with a portable consumer device associated with a second payment processing network may start with a "5." As such, when the acquirer receives the authorization request message or other message from the consumer requesting authorization from the account issuer, the acquirer computer can determine quickly and easily which payment processing network to forward the request to based on the payment processing network indicator. If it is a 4, the message is forwarded to the first payment processing network server computer, and if it is a 5, the message is forward to the second payment processing network server computer.

A "check sum digit" may be a fixed-size piece of data computed from the digital data in the rest of the second token for the purpose of detecting accidental errors that may have been introduced during its transmission or storage. The integrity of the data can be checked at any later time by calculating the checksum and comparing it with the stored check sum digit. If the check sums match, the data was most likely not altered or corrupted. The check sum digit is computed using a check sum function or algorithm that is known to the transaction system so that the preexisting transaction system can utilize the second token without requiring any upgrades or further infrastructure changes.

Data may be "sensitive" if its disclosure to third parties may allow those parties to initiate fraudulent or unauthorized transactions using the account holders information. Additionally, there may be numerous levels of sensitivity, meaning that some data may be more or less sensitive than other data. For example, some data may be sensitive but also be publicly available. For instance, a consumer's name may be used in an authentication process and is thus sensitive but it is also public information and easily determined, thus it is not as sensitive as a consumer's account number. Additionally, data that may be used at more access points may be more sensitive than information that can only be used a one or a minimal number of access points. The data is more sensitive because there are more options for the data to be used to initiate transactions.

An "authorization request message" may be a message that includes a second token that is sent to a second entity from a first entity such that the transaction may be authorized. The authorization request message may be sent to the second entity who may extract the second token from the authorization request message and determine the account identifier by electronically searching a database for an account identifier associated with the second token. The second entity may then modify the authorization request message to include the account identifier and may send the modified authorization request message to an account issuer computer for processing. The account identifier may be a payment card account identifier associated with a payment card. The authorization request message may request that an issuer of the payment card authorize the transaction. An authorization request message according to an embodiment of the invention may comply with ISO 8583, which is a standard for systems that exchange electronic transactions made by cardholders using payment cards, or other electronic data interchange formats.

An "authorization response message" may be a message that includes a response from the issuer computer as to whether the transaction is authorized or not. The authorization response message is generated by the issuer computer and sent to the second entity and may include the account identifier. The second entity may convert the account identifier back to the second token by using the same generation process as explained above or by storing the corresponding second token. Additionally, the first entity may convert the second token back into the first token in some embodiments and modify the authorization response message to protect the second token. Accordingly, when the authorization response message is sent back to the first entity and eventually the consumer, the sensitive information used in the multiple tokenization authentication may not be disclosed. This may ensure that the first entity does not gain access to the sensitive account identifier at any time while still informing the first entity and the consumer the outcome of the authorization request.

A "server computer" can be a powerful computer or a cluster of computers. For example, the server computer can be a large mainframe, a minicomputer cluster, or a group of servers functioning as a unit. In one example, the server computer may be a database server coupled to a Web server.

"Derived from" may mean any use of data be included, a factor of, multiplied by, or otherwise have a relationship with a set of data. Data "A" may be derived from "Data B" if "Data A" includes "Data B," was generated using "Data B," in whole or in part, or was relied upon, directly or indirectly, in generating the second set of data. As such, data that is derived from another piece of data may have been added to, subtracted from, multiplied by, or any other operation that relies directly or indirectly on the original data.

Generally, embodiments relate to apparatuses, systems, and methods of authenticating cardholders during a transaction. In particular, some embodiments may provide multiple tokenization authentication of a cardholder during a payment transaction.

I. Exemplary Multiple Tokenization Authentication System

An exemplary system 100 for embodiments of the technology can be seen in FIG. 1. For simplicity of discussion, only one of each component is shown. It is understood, however, that embodiments of the technology may include more than one of each component. In addition, some embodiments of the technology may include fewer than all of the components shown in FIG. 1. Also, the components in FIG. 1 may communicate via any suitable communication medium (including the internet), using any suitable communication protocol. The exemplary system 100 depicts an example of the system in which multiple tokenization for authentication may take place.

FIG. 1 shows a system 100 that can be used in an embodiment of the technology. The system 100 includes a merchant 103 and an acquirer 104 associated with the merchant 103. The merchant 103 may have data processing subsystems, networks, and operations used to support any merchant and/or consumer data. The acquirer 104 processes a transaction via an acquirer processor 105. The acquirer processor 105 may be coupled to an acquirer server computer or the acquirer processor 105 may be a part of an acquirer server computer. The acquirer server computer is a server computer located at the acquirer 104. In a typical payment transaction, a consumer 101 may purchase goods or services at the merchant 103 using a portable consumer device 104. The acquirer 104 can communicate with an issuer 108 via a payment processing network 106. The issuer 108 processes a transaction via an issuer processor 107. The consumer 101 may be an individual, or an organization such as a business that is capable of purchasing goods or services.

The portable consumer device 102 may be in any suitable form. For example, suitable portable consumer devices can be hand-held and compact so that they can fit into a consumer's wallet and/or pocket (e.g., pocket-sized). The portable consumer device 102 typically comprises a processor, and a memory, input devices, and output devices, operatively coupled to the processor. Specific examples of portable consumer devices can include forms of portable communication devices, such as cellular or wireless phones, tablets, smartphones, personal digital assistants (PDAs), pagers, portable computers, and the like. The portable consumer devices can also be payment cards, such as smartcards, debit devices (e.g., a debit card), credit devices (e.g., a credit card), or stored value devices (e.g., a stored value card). In some embodiments, the portable consumer device 102 may be associated with multiple financial accounts, such as being associated with different payment accounts (e.g., credit, debit, or prepaid). Likewise, it is possible for the consumer 101 to have multiple portable consumer devices 102 that are associated with the same underlying financial account.

The payment processing network 106 may include data processing subsystems, networks, and operations used to support and deliver authorization services, exception file services, and clearing and settlement services. An exemplary payment processing network 106 may include VisaNet™. Payment processing networks 106 such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 106 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 106 may use any suitable wired or wireless network, including the Internet.

The merchant 103 may also have, or may receive communications from, an access device that can interact with the portable consumer device 102. The access devices according to embodiments of the technology can be in any suitable form. Examples of access devices include point of sale (POS) devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like.

If the access device is a POS terminal, any suitable point of sale terminal may be used including card or phone readers. The card or phone readers may include any suitable contact or contactless mode of operation. For example, exemplary readers can include RF (radio frequency) antennas, magnetic stripe readers, etc. to interact with the portable consumer devices 102.

In a typical purchase transaction, the consumer 101 purchases a good or service at the merchant 103 using the portable consumer device 102. The consumer's portable consumer device 102 can interact with an access device such as a POS terminal at the merchant 103. For example, the consumer 101 may take a wireless phone and may pass it near a contactless reader in a POS terminal.

An authorization request message is then forwarded to the acquirer 104. After receiving the authorization request message, the authorization request message is then sent to the payment processing network 106. The payment processing network 106 then forwards the authorization request message to the issuer 108 of the portable consumer device 102.

After the issuer 108 receives the authorization request message, the issuer 108 sends an authorization response message back to the payment processing network 106 to indicate whether or not the current transaction is authorized (or not authorized). The transaction processing system 100 then forwards the authorization response message back to the acquirer 104. The acquirer 104 then sends the response message back to the merchant 103.

After the merchant 103 receives the authorization response message, the access device at the merchant 103 may then provide the authorization response message for the consumer 101. The response message may be displayed by the POS terminal, or may be printed out on a receipt.

At the end of the day, a normal clearing and settlement process can be conducted by the payment processing network 106. A clearing process is a process of exchanging financial details between an acquirer 104 and an issuer 108 to facilitate posting to a consumer's 101 account and reconciliation of the consumer's 101 settlement position. Clearing and settlement can occur simultaneously. Typically, the merchant 103 sends the clearance information to the acquirer 104 at the end of the day, and the acquirer 104 and issuer 108 can subsequently facilitate the clearing and settlement process.

In some cases, the consumer 101 may conduct a financial transaction using the portable consumer device 102. As described above, in the typical purchase transaction, the portable consumer device 102 may include portable communication devices, such as a cellular or wireless phones, personal digital assistants (PDAs), pagers, portable computers, tablets, and the like. As such, the portable consumer device 102 may also be used to conduct the typical purchase transaction.

Figure 2:
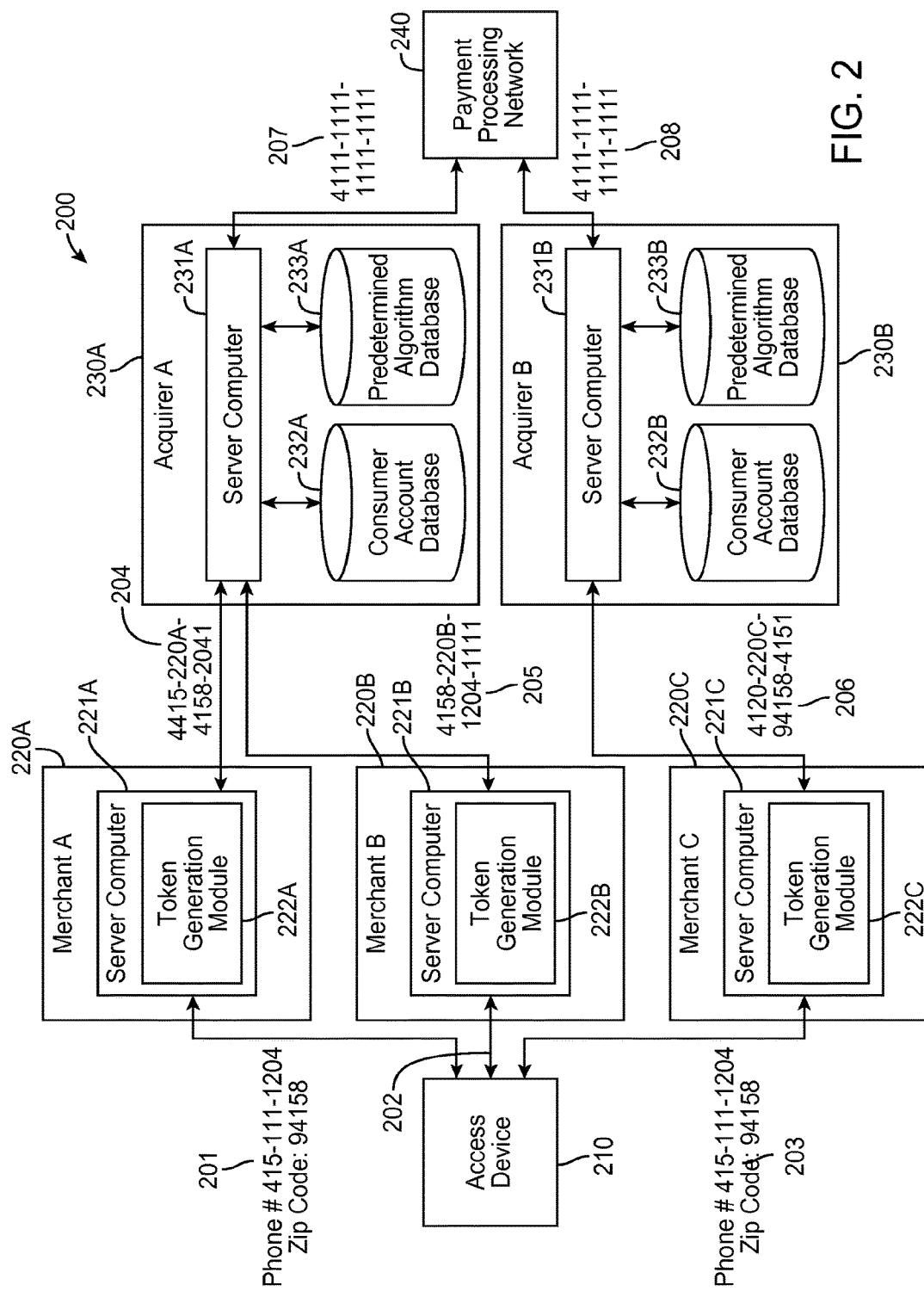
FIG. 2 depicts a block diagram illustrating a portion of a transaction processing system that may be used with some embodiments of the present invention showing functional aspects of some of the entities.

FIG. 2 shows a block diagram illustrating a portion of a transaction processing system 200 that may be used with some embodiments of the present invention showing functional aspects of some of the entities. The portion of the transaction processing system 200 illustrated in FIG. 2 shows multiple first entities (in this case merchants 220A-220C) as well as multiple second entities (in this case acquirers 230A-230B) in order to illustrate how the multiple tokenization authentication process may differ between numerous first entities (merchants 220A-220C) and second entities (acquirers 230A-230B). The portion of the transaction processing system 200 shown in FIG. 2 includes an access device 210, merchants 220A-220C, acquirers 230A-230B, and a payment processing network 240. Accordingly, an account issuer and a consumer are not shown in the figure in order to simplify the system.

The access device 210 may comprise any portable consumer device, merchant POS device, or any other device described above that allows consumer input to be received by a first entity. The access device 210 may receive input from the consumer directly or indirectly through a cashier inputting information for the consumer. Furthermore, the access device 210 may be a consumer device such as a wireless communication device or other portable consumer device capable of transmitting data to the merchant 220A. For example, the consumer could use a mobile phone utilizing a digital wallet to input the first token 201-203. The data could then be encrypted and transmitted to an access device 210 at the merchant 220A configured to receive communications from the portable consumer device. Any suitable method of transmitting the information may be used including the use of near field communications components, wireless communications protocols, docking, plugging a communications line from the access device 210 into the portable consumer device, short message system or texting systems, or submitting the payment over an internet connection. One or ordinary skill in the art would recognize the many methods through which the data could be transmitted to the merchant 220A from a portable consumer device.

The access device 210 in one exemplary embodiment of a payment processing system 200 may also be dedicated to a particular merchant 220A and allow the consumer to input the information through a data input interface on the access device. The data input interface may be digital or analog and could allow input of any suitable information. For example, the access device 210 may be configured to accept biometric information (eye voice, fingerprint, etc.) or any other suitable information.

The consumer may be prompted to enter the first token 201-203 by any suitable access device 210 or may offer the information without being prompted. Any method may be implemented for receiving the first token 201-203. For example, a challenge-response type of prompt may be provided to the consumer or the consumer may be given a choice of multiple methods of authentication. For instance, when a consumer chooses products to purchase at a merchant 220A, a cashier may ask the consumer for their first token 201. Alternatively, an access device 210 may prompt the consumer to enter the first token 201 manually.

The access device 210 may also accept a consumer identifier. The consumer identifier may be any information that the merchant 220A either provided to the consumer or the consumer provided to the merchant 220A during registration that allows the merchant 220A to quickly and easily recognize the consumer. The consumer identifier could be provided by the consumer's portable consumer device or by manual input by the consumer or other party to the transaction. The merchant server computer 221A may receive the consumer identifier along with the first token 201 or in a separate consumer input. For example, if the consumer is using a wireless device to provide the first token 201, any transmitted information could contain both a first token 201 and the consumer identifier. Additionally, the consumer identifier could be an account number of a consumer rewards card or other secondary information related to the merchants' records for the consumer. During a multiple tokenization authentication process, the merchant server computer 221A may determine whether the first token 201 is associated with the consumer identifier in order to verify that the first token 201 is not being used by an unauthorized third party. For example, if a third party intercepts a consumer's first token 201 during a transaction at a merchant 220A, it may be possible in certain embodiments of the present invention to complete a transaction with only the knowledge of the first token 201. Accordingly, using the second piece of data to verify the first token 201 may be beneficial. This feature may be especially useful in systems where the first token 201 is simple or is based on publicly available information about the consumer (e.g. consumer's son's name) that may be easily overheard, sniffed, or otherwise intercepted by a malicious third person not authorized to complete a transaction using the consumer's account.

The merchants 220A-220C may communicate with the access device 210 in any suitable manner. However, the access device 210 may not be connected to each merchant 220A-220C at the same time as shown in the figure. The access device 210 is shown as one block in the interest of simplicity, and the access device 210 does not necessarily need to connect to more than one particular merchant at any given time. Each merchant 220A-220C may have their own access device 210 or the consumer may provide the access device 210 through a mobile phone or other device.

In FIG. 2, all of the merchants 220A-220C are shown as containing the same components to simplify the explanation of the system. However, each merchant 220A-220C may have a different embodiment of the multiple tokenization authentication system described herein. Because the merchants 220A-220C and the acquirers 230A-230B have a preexisting relationship and the information is being passed between the two entities, any scheme may be used for each merchant 220A-220C as long as the acquirer 230A and merchant 220A are both aware of the type of multiple tokenization authentication procedure being implemented. Furthermore, a single acquirer 230A-230B may offer different multiple tokenization authentication methods to the merchants 220A-220C so that the merchants 220A-220C are provided with flexibility in choosing their preferred method. However, because each merchant 220A-220C contains the same functionality in this example, the merchants 220A-220C will be described in reference to merchant A 220A.

Merchant A 220A comprises a server computer 221A that may communicate directly or indirectly with each and every other entity in the transaction processing system 200. A server computer is typically a powerful computer or cluster of computers. For example, the server computer can be a large mainframe, a minicomputer cluster, or a group of servers functioning as a unit. In one example, the server computer may be a database server coupled to a web server.

The server computer 221A may comprise a token generation module 222A. The token generation module 222A is used by the merchant A server computer 221A to generate a second token 204 based on a first token 201 received from the access device 210. The second token 204 may be based on the first token 201 in any suitable manner. For example, the token generation module 222A may generate the second token 204 by altering information from the first token 201. The information in the first token 201 may be altered by taking a hash of information contained in the first token 201, applying an algorithm to computer new values derived from the information in the first token 201, amending or subtracting particular data from the first token 201, or any other suitable manner as one of ordinary skill in the art would recognize.

Additionally, the second token 204 may be derived from a first entity identifier (in this case a merchant identifier). The merchant identifier may be any data that informs a second entity (in this case an acquirer 230A) the identity of the merchant 220A. For example, a merchant 220A could be given a number (220A) that identifies the merchant 220A to the acquirer server computer 231A. The acquirer server computer 231A could then store the merchant identifiers in a predetermined algorithm database 233A.

The predetermined algorithm database 233A may also include a predetermined algorithm to apply to a second token 204 to determine a recognizable value for associating the second token 204 with an account identifier 207. Additionally, the predetermined algorithm database 233A may contain any information about the merchant 220A that the acquirer 230A needs in order to complete the transaction or the multiple tokenization authentication process. For example, the predetermined algorithm database 233A could inform the acquirer 230A which embodiment of the multiple tokenization authentication the merchant 220A has implemented. A benefit of some embodiments of the multiple tokenization authentication process described herein is that data flows may appear to be uniform with older transaction systems so that the process will work on existing infrastructure. However, in order for the multiple tokenization authentication to be recognized by the acquirer 230A so that it may be processed differently than other standard transactions, the acquirer 230A must be able to determine whether a message from the merchant 220A is utilizing a multiple tokenization authentication process. Accordingly, the use of a merchant identifier in a predetermined algorithm database 233A may inform the acquirer 230A whether (and which type of) multiple tokenization authentication is being performed.

Other identifiers may also be used to inform the acquirer 230A that multiple tokenization authentication is being implemented for the transaction. For example, a flag within the second token 204 that is significantly different than in a typical authorization request message may notify the acquirer 230A that the message is requesting multiple tokenization authentication. Additionally, a preliminary message may be sent to the acquirer 230A, the message would inform the acquirer 230A that a second message may need multiple tokenization authentication performed and identify the message in some suitable manner.

The first token 201 may be provided by a consumer through the access device 210 or through any other means. The first token 201 provided by the consumer may be the same for each merchant 220A-220C (shown) or may be different for each merchant 220A-220C (See FIG. 7). The first token 201 may include a very minimal amount of information or may comprise vast amounts of data. For example, a first token 201 could be as simple as a consumer's dog's name or as complex as a representation of a consumer's biometric information or other input. The type and amount of information provided may change depending on which embodiment of the multiple tokenization authentication process is being implemented. For example, a merchant 220A that maintains a second token 204 in a token association database may only need a single piece of information that associates the consumer to the stored second token 204. In contrast, a merchant 220A that generates a second token 204 each time the consumer performs a transaction may need more information from the consumer in order to increase the security and allow a large number of consumers to use the system. However, the multiple tokenization authentication may work with any first token input 201-203 that correlates a consumer to a pre-generated second token 204 or allows a second token 204 to be generated. Accordingly, there is no limit on the first token's 201-203 complexity or simplicity.

The first tokens 201-203 being provided in the exemplary system of FIG. 2 include a consumer's phone number (415-111-1204) and zip code (94158). The consumer may have previously registered with the acquirer 230A for multiple tokenization so that personal consumer information is stored at the acquirer 230A along with an account identifier 207 that identifies an account issued by an account issuer (not shown). Therefore, when the consumer provides their phone number and zip code in the first token 201, the merchant 220A may use the phone number and zip code in the first token 201 to generate a second token 204 that may be sent to an acquirer 230A to find an account identifier 207 associated with the information contained in the second token 204. The consumer information in the first token 201 may be used in entirety or only portions may be used. For example, the token generation module 222A may only use the last four digits of the phone number (1204) or some other portion of the information when generating the second token 204.

The amount of data necessary to create a second token 204 may depend on the number of consumers the system is designed for as well as other variables including the method used by consumers to enter the first token 201. For example, if a consumer uses a mobile device that contains the first token 201 and merely swipes the mobile device over a near field communication receiving device, then more data may be received because the consumer does not have to input the data manually. However, if the consumer is manually entering the information into an access device 210 located at the merchant 220A, the first token 201 may include one or two pieces of personal data such as a phone number and/or zip code.

The second tokens 204-206 of FIG. 2 provide an example of generating the second tokens 204-206 by altering information in the first token 201-203. For example, the token generation module 222A of the server computer located at the merchant 220A alters the consumer information provided in the first token 201 (phone number of 415-111-1204 and zip code of 94158) and generates a second token 204 (4415-220A-4158-2041). The second token 204 may be derived from a first entity identifier (in this case the merchant identifier 220A) where being derived from can mean the second token 204 comprises the merchant identifier or some set of values that are related to the merchant identifier. For example, each digit of a merchant identifier 220A could be doubled to create a merchant identifier of 440A to create more complexity. Either way, the second token 204 may comprise or be derived from a merchant identifier of the merchant server computer 221A generating the second token 204. The second token 204 may be stored at the merchant 220A but there it is not necessary in this embodiment. In order to provide the highest level of protection, the merchant 220A may not store the second token 204 so that there is no consumer data to be stolen if a malicious third party gains access to the merchant server computer 221A or the merchant's 220A corresponding databases. Accordingly, the merchant 220A has no liability for hacking or data theft activities that result in the theft of sensitive consumer information.

The token generation module 222A may generate the second token 204 in any suitable manner (e.g. hashing, substitution, etc.) as one of ordinary skill in the art would recognize. In one embodiment, the token generation module 222A may contain a predetermined algorithm that is shared with the acquirer 230A. The acquirer 230A may provide the predetermined algorithm to the merchant 220A during the merchant registration phase or the merchant 220A may determine the predetermined algorithm and provide it to the acquirer 230A. Either way, the two parties may share the predetermined algorithm that may be used to generate the second token 204. The predetermined algorithm may be stored at the acquirer 230A in a predetermined algorithm database 233A that correlates the predetermined algorithm with the merchant identifier so that when the acquirer 230A determines the merchant identifier, the acquirer 230A may know which predetermined algorithm is being used. In this manner, the acquirer 230A may use a unique algorithm with each and every merchant 220A-220B it has a relationship with. Accordingly, the system is secure even if a predetermined algorithm of one merchant 220A is discovered by a malicious third party because the second token 204 generated by one merchant 220A may be completely meaningless at another merchant 220B. As such, if the merchant 220A is hacked, the malicious third party may not be able to charge any unauthorized transactions at any other merchants 220B-220C.

For example, the second token 204 generated at merchant A 220A (4415-220A-4158-2041) is different from the second token 205 generated at merchant B 220B (4158-220B-1204-1111) and the second token 206 generated at merchant C 220C (4120-220C-4158-4151) even though the first token 201-203 is consistent between each merchant 220A-220C. Accordingly, each token generation module 222A-222C operating at each server computer 221A-221C at each merchant 220A-220C is using a different predetermined algorithm to generate the second token 204-206. Therefore, acquirer A 230A must be able to tell which merchant 220A-220B is sending the second token 204 so that the correct predetermined algorithm is used. If the acquirer 230A did not have the correct predetermined algorithm in order to convert, decode, or decrypt the second token 204, the data contained therein would be meaningless.

Accordingly, the second token 204 is derived from the merchant identifier 220A-220C of each second token generation module 222A-222C. The second token 204 may have a data position or plurality of data positions wherein the merchant identifier may be found by the acquirer 230A. For example, as can be seen in FIG. 2, the fifth through the eighth digit of each second token 204-206 comprises the merchant identifier 220A-220C for the corresponding merchant 220A-220C generating the second token 204-206. As such, the acquirer 230A may know where to find the merchant identifier in the second token 204 and extract the merchant identifier from the second token 204. The acquirer server computer 231A would then use the merchant identifier extracted from the second token 204 to electronically search for the predetermined algorithm that corresponds to the merchant identifier in the predetermined algorithm database 233A.

Examples of predetermined algorithms may be shown by dissecting the values of the first tokens 204-206 in FIG. 2. The predetermined algorithms are different for each merchant 220A-220C but all of the predetermined algorithms implement a hash type of alteration of the first token 201-203 data. For example, merchant A 220A implements a predetermined algorithm that applies a payment processing network indicator (4) and uses the area code of the consumer's phone number as the next three digits (415). The predetermined algorithm then applies the merchant identifier for the next four digits (220A). The third set of data is the last four digits of the consumer's zip code from the first token 201 (4158). The predetermined algorithm then hashes the last three digits of the consumer's phone number as the next three digits (204) and then implements a check sum digit (1) to inform the acquirer 230A that the data has not been altered intentionally or unintentionally during transmission of the second token 204. Accordingly, the predetermined algorithm defines which data to hash from the first token 201 and how to combine the data. The data may be from multiple sources including the first token 201, the merchant identifier, and the data required for processing (payment processing network indicator and check sum digit). Any other type of alteration may be applied to the data as one of ordinary skill in the art would recognize.

In contrast, merchant B 220B generates a different second token 205 using the same first token 202 input by applying a different predetermined algorithm to alter the first token 202 information. For example, merchant B 220B implements a predetermined algorithm that applies a payment processing network indicator (4) and uses the last three digits of zip code as the next three digits (158). The predetermined algorithm then applies the merchant identifier for the next four digits (220B). Note that the merchant identifier may be placed in the same data locations as by the token generation module 222A of merchant A 220A. As such, the predetermined algorithms used at one or more merchants 220A-220C may share some characteristics. The third set of data is the last four digits of the consumer's phone number from the first token 202 (1204). The predetermined algorithm then hashes the first three digits of the consumer's phone number as the next three digits (111) and then implements a check sum digit (1) to inform the acquirer 230A that the data has not been altered intentionally or unintentionally during transmission of the second token 205. Accordingly, the second token 205 generated by merchant B 220B is 4158-220B-1204-1111 and the second token 204 generated by merchant A 220A is 4415-220A-4158-2041. Accordingly, the different predetermined algorithms create very different second tokens 204-205 by altering the data included in the same first token 202. Furthermore, the predetermined algorithm used by merchant C 220C is different as well and generates a second token 206 that is different than the prior two merchants as well (4120-220C-4158-4151).

Accordingly, although the same first token 201-203 information was used by both predetermined algorithms, the generated second tokens 204-206 are much different and if the predetermined algorithm was not known by the receiving entity, the data would be meaningless. Furthermore, because the data may be in the format of a payment card number (being 16 digits and including payment processing network indicator and check sum digit) an entity receiving the second token 204-206 would not know that the received information was not an account number or other account indicator.

For example, the second tokens 204-206 shown in FIG. 2 are all 16 digits long just as some typical payment card numbers. Furthermore, each second token 204-206 starts with a digit 4 that signifies the payment processing network indicator. The payment processing network indicator informs the acquirer 230A of which payment processing network 240 to forward the second token 204-206 is associated with. Acquirers 230A-230B may store their account identifiers 207-208 based on the payment processing network indicator or may store all account identifiers in a central location. Additionally, each of the second tokens 204-206 end with a "1" digit. This signifies the check sum digit in the exemplary embodiment. The check sum digit may inform the payment processing network 240 whether the data has been modified intentionally or accidentally while being stored or transmitted. Here, the 1 indicates that the data has not been modified. The check sum digit may also comprise any other numerical or alphanumeric value indicating that the data is legitimate.

After generating the second token 204 using the token generation module 222A, the merchant server computer 220A sends the second token 204 to an acquirer 230A that the merchant 220A has a preexisting relationship with (in this case acquirer A 230A). The second token 204 may be sent to the server computer located at the acquirer 230A through any suitable manner. For example, the server computer at the merchant 220A may include the second token 204 in an authorization request message. The authorization request message may be sent to the acquirer 230A who may extract the second token 204 from the authorization request message and determine the account identifier 207 by electronically searching a database for an account identifier 207 associated with the second token 204. The authorization request message according to an embodiment of the invention may comply with ISO 8583, which is a standard for systems that exchange electronic transactions made by cardholders using payment cards, or other electronic data interchange formats.

The acquirers 230A-230B may comprise a server computer 231A-231B, a consumer account database 232A and a predetermined algorithm database 233A. The acquirers 230A-230B all share similar components in this exemplary embodiment shown in FIG. 2. However, the acquirers 230A-230B could implement different embodiments of the multiple tokenization authentication as long as the acquirers 230A-230B and merchants 220A-220C agreed to the type of authentication being implemented.

The acquirer server computer 231A may comprise any necessary modules, functions, or components such that it may communicate with the merchant server computers 221A-221C. A server computer is typically a powerful computer or cluster of computers. For example, the server computer can be a large mainframe, a minicomputer cluster, or a group of servers functioning as a unit. In one example, the server computer may be a database server coupled to a web server. The acquirer sever computer may receive the authorization request message from the merchant server computer 221A and extract the second token 204 from the authorization request message.

The predetermined algorithm database 233A may store merchant identifiers and predetermined algorithms corresponding to each merchant identifier. The merchant identifier may be used to determine the correct predetermined algorithm to use to convert or decode the second token 204 received from the merchant 220A. As explained previously, the second token 204 may be derived from a merchant identifier that identifies the merchant 220A to the acquirer 230A. Prior to the multiple tokenization authentication, the acquirer 230A may share a predetermined algorithm with the merchant 220A that may be stored in a predetermined algorithm database 233A during a merchant registration process. The predetermined algorithm that is determined by the acquirer 230A and merchant 220A during registration may be saved in a predetermined algorithm database 233A in such a manner that the predetermined algorithm may be returned if the merchant identifier is known. As such, the predetermined algorithm database 233A may be organized according to a merchant identifier or other identifying information that informs the acquirer 230A of the predetermined algorithm that a merchant 220A used to generate the second token 204.

The second entity may use the first entity identifier to determine the account identifier 207 associated with a second token 204. For example, the acquirer server computer 231A may determine the first entity identifier (in this case a merchant identifier) and may determine the predetermined algorithm that is associated with the merchant identifier. As such the second entity may use the first entity identifier to determine the predetermined algorithm. The acquirer 230A may then determine the account identifier 207 by using the predetermined algorithm to determine the account identifier 207 associated with the second token 204. The predetermined algorithm may be used to convert, decrypt, or decode the second token 204 into a recognizable value. The recognizable value may contain one or more pieces of information that are associated with the consumer. The recognizable value may only be a portion of consumer information (e.g. a phone number missing two digits).

As such, the second entity may use the predetermined algorithm to convert the second token 204 into a recognizable value associated with the first token 201. For example, using the second token 205 from merchant B 220B in FIG. 2, the acquirer 230A could use the merchant identifier contained in the second token 205 (220B) to determine the merchant's predetermined algorithm. The acquirer 230A could then use the predetermined algorithm to convert the second token 205 (4158-220B-1204-1111) into a recognizable value. As explained above, the predetermined algorithm for merchant B 220B includes hashing the consumer's phone number and zip code. Therefore, the predetermined algorithm could be used to convert the data back into recognizable portions of the consumer's phone number and zip code.

For example, recognizable values may be determined by using the predetermined algorithm to determine the meaning of information contained in the second token 205. Such as portions of the consumer's phone number constituting (xxx-111-1204) and zip code (xx158). Accordingly, the recognizable value would be the portions of the phone number and zip code converted from the second token 205 using the predetermined algorithm. The acquirer 230A could then search a consumer account database 232A for a consumer with a zip code with the last three digits 158 and phone number of 111-1204. Accordingly, the first entity could use the recognizable value associated with the first token 202 to electronically search a consumer account database 232A for the account identifier 207. Most likely if the consumer is registered with the acquirer 230A, only one consumer will have both information matched in the registered consume database. In this case, the recognizable value matches an account identifier 207 of 4111-1111-1111-1111. Note that the numbering of the account identifier 207 may not have any relationship to that of the second token 205. Accordingly, the multiple tokenization authentication process has generated a second token 205 that an acquirer 230A can now recognize as associated with a particular account identifier 207 (4111-1111-1111-1111).

The consumer account database 232A may be any type of information storing apparatus that allows the server computer to access data when requested. The consumer account database 232A may store information such that an account identifier 207 may be returned whenever a recognizable value is determined from the second token 204 and associated with an account identifier 207. As such, a second entity may use the first entity identifier to determine the account identifier 207 associated with the second token 204. The recognizable value may be any consumer information that was saved to the consumer account database 232A during a consumer registration process.

The consumer registration process may include any suitable process for receiving information from the consumer regarding their account. The process may be initiated by the consumer (not shown), the merchant 220A, or the acquirer 230A. Furthermore, if the acquirer 230A already has account information for a consumer stored, the acquirer 230A may automatically register the consumer for the multiple tokenization authentication using the consumer's personal information. The consumer could then be informed upon the next initiated transaction through any suitable means. The consumer could then initiate transactions using only their first token 201 instead of typical transaction information. Furthermore, the consumer registration process may be performed by the merchant server computer 221A or by the acquirer server computer 231A. For example, the merchant 220A could ask the consumer for their personal information, first token 201, etc. and then forward all the information to the acquirer 230A to be stored. The merchant 220A may not store this information locally so that they may not be liable for any data breaches.

In some embodiments, a second token 204 may be generated during the consumer registration process and stored at the merchant 220A for future use during transactions. This may be beneficial for the merchant 220A not to have to generate a new second token 204 each and every time a transaction occurs. The second token 204 may be generated during the consumer registration process and stored at a second token 204 database through any suitable means as will be discussed in further detail below.

The payment processing network 240 may comprise data processing subsystems, networks, and operations used to support and deliver authorization services, exception file services, and clearing and settlement services. The payment processing network 240 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing network 240 may be connected to an account issuer computer as shown in FIG. 1.

Figure 3:
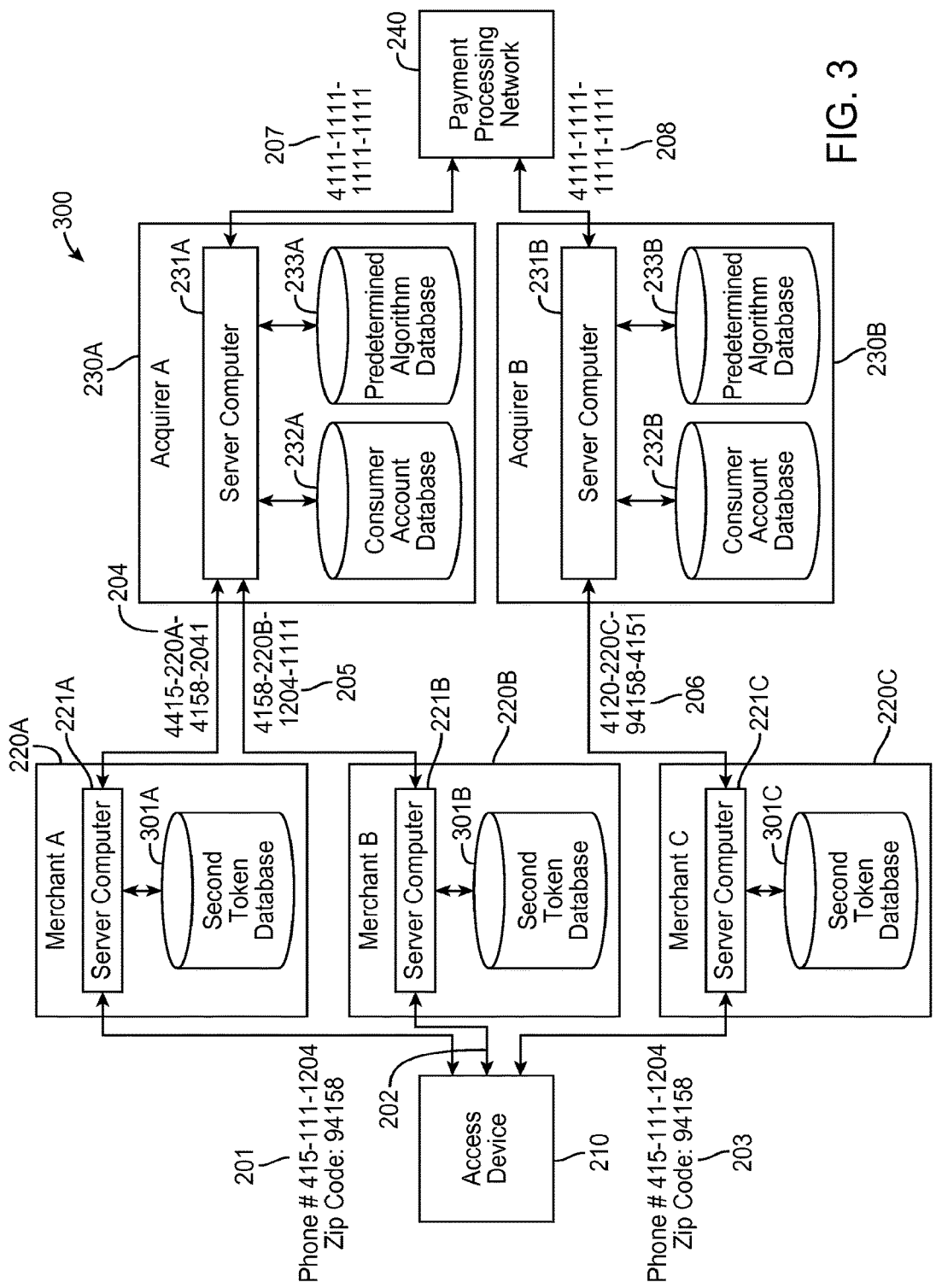
FIG. 3 depicts a block diagram illustrating a portion of a transaction processing system that may be used with some embodiments of the present invention showing functional aspects of some of the entities.

FIG. 3 depicts a block diagram illustrating a portion of a transaction processing system 300 that may be used with some embodiments of the present invention showing functional aspects of some of the entities. Although most of the entities are the same between FIG. 2 and FIG. 3, there are important differences. For example, the merchants 220A-220C in FIG. 3 comprise a second token database 301A that stores a generated second token 204 for easy searching and recall during a transaction. In this manner, a new second token 204 may not need to be generated for every transaction. The rest of the system is identical to that of FIG. 2.

Instead of generating a second token 204 each time the merchant 220A receives a first token 201 from a consumer, in some embodiments the merchant 220A may store the second token 204 in a second token database 301A during the registration phase. The second token database 301A may store the generated second token 204 in any suitable manner. For example, the second token database 301A may store a consumer's second token 204 corresponding to the received first token 201, meaning that the second token 204 is generated from the first token 201 and then a reference to the first token 201 is stored in the second token database 301A to facilitate easy searching. Furthermore, a portion or the entire second token 204 may be generated from the received first token 201 and then compared to the second token database 301A to ensure there is an existing second token 204 for the received first token 201 prior to sending the second token 204 to the second entity. In this manner, the system may also validate the first token 201 as belonging to a registered consumer. For example, if a consumer provides their phone number as part of the first token 201, and the predetermined algorithm uses the first three digits of the consumer's phone number in a second token 204, the token generation module 222A may generate the portion of the second token 204 that comprises the phone number digits and use that portion of the second database to search for the associated stored second token 204 in the second token database 301A. Other short cuts to determining an appropriate second token 204 that is stored in a second token database 301A for a particular consumer may be implemented in the system as well.

Note that because the second token 204 is meaningless without knowing how the information contained in the first token 201 is altered, storing the second token 204 at the merchant 220A does not undermine the merchant's ability to limit their liability. If a third party gained access to the second token database 301A which would be associated with a number of first tokens 201, the second token 204 may not be usable by other merchants 220B-220C, nor would they reveal sensitive information about the consumer to a third party. Therefore, storing the second token 204 in a database at the merchant 220A does not undermine the purpose of limiting the liability of a merchant 220A for data breaches.

Once the server computer gains the appropriate second token 204 associated with the first token 201 from the second token database 301A, the merchant 220A may send the second token 204 to the acquirer server computer 231A as explained in reference to FIG. 2 above. The rest of the system operates in the same manner as FIG. 2 above.

Figure 4:
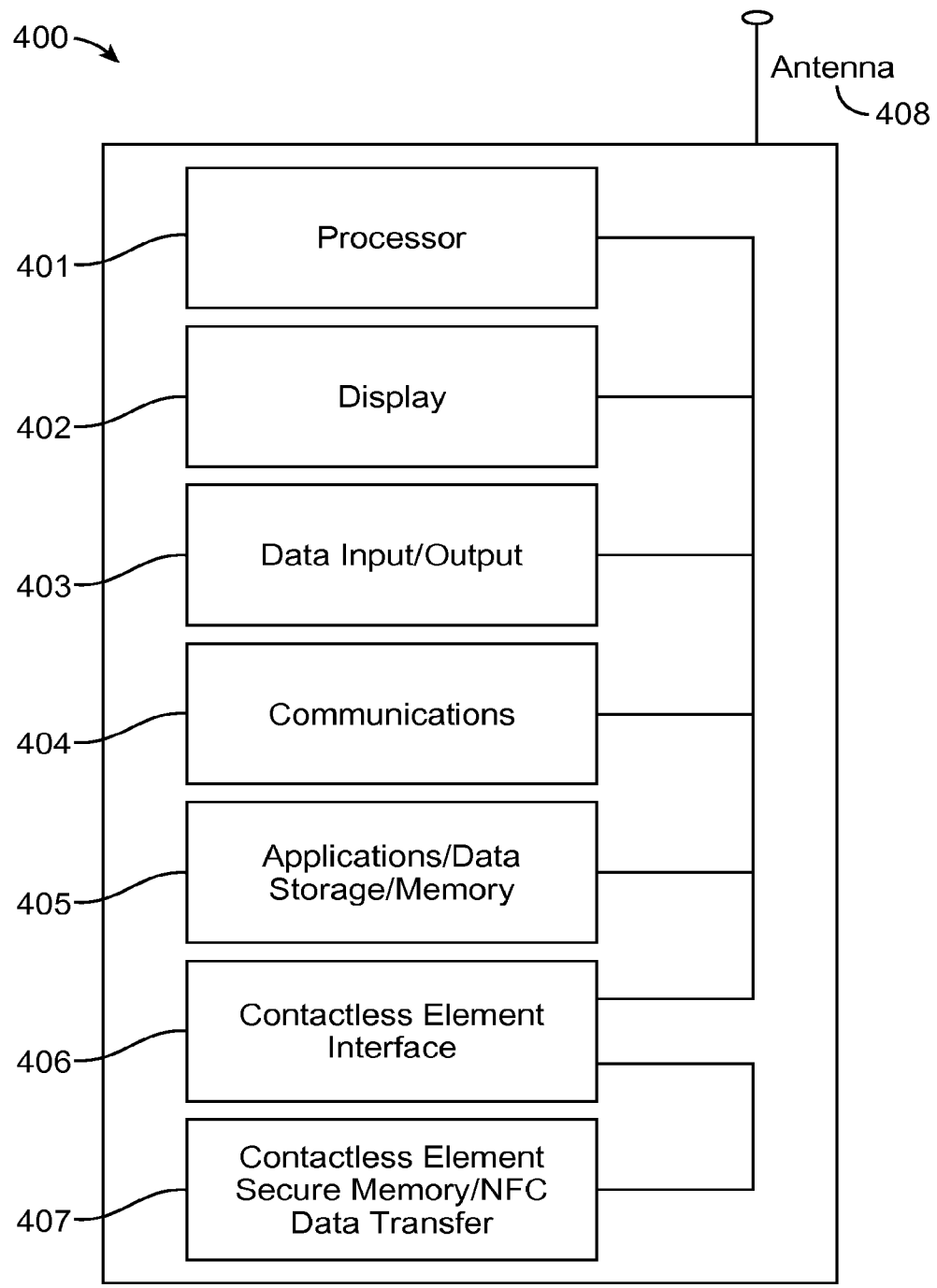
FIG. 4 depicts a block diagram illustrating an exemplary embodiment of an access device.

One example of a portable consumer device 102 that may be used to implement embodiments of the present invention is a mobile wireless phone equipped with a NFC capability. FIG. 4 is a functional block diagram illustrating the primary components of a portable consumer device (e.g., element 102 of FIG. 1), such as a mobile phone that may be used as part of the inventive system and methods.

As illustrated in FIG. 4, mobile communication device 400 may include circuitry that is used to enable certain telephony and other device functions. The functional elements responsible for enabling those functions may include a processor 401 for executing instructions that implement the functions and operations of the device. Processor 401 may access data storage 405 (or another suitable memory region or element including the secure memory located on the contactless element) to retrieve instructions or data used in executing the instructions.

Data input/output elements 403 may be used to enable a consumer to input data (via a microphone, keyboard, touchscreen, fingerprint detector, biometric data input device, for example) or receive output data (via a display screen 402 or speaker, for example). Communications element 404 may be used to enable data transfer between mobile communication device 400 and a wireless network (via antenna 408, for example) to assist in enabling telephony and data transfer functions. The mobile communication device 400 may also include contactless element interface 406 to enable data transfer between contactless element 408 and other elements of the device, where contactless element 406 may include a secure memory and a near field communications data transfer element. The contactless element 408 may implement a near field communications capability that enables communication and data transfer between mobile communication device 400 and an access device 210 including a device reader or POS terminal that is part of a transaction processing system 100.

Data storage 405 may be a memory that stores data, and may be in any suitable form including a memory chip, disk drive, flash memory, etc. The memory may be used to store data such as consumer identification or authentication information, consumer account information, transaction data, etc. Stored financial information may include information such as bank account information, bank identification number (BIN), credit or debit card account number information, account balance information, expiration date, consumer information such as name, date of birth, etc. Note that such data may instead, or also be stored in a secure memory element, such as secure memory 407 or a similar secure memory that is part of contactless element 406. As described, data storage 405 may also contain instructions which when executed by processor 401 implement operations or processes that are part of the operation of the device or of applications installed on the device.

Data storage 405 or a secure memory element that is part of contactless element 407 may include a mobile payment application that is activated in order to initiate or otherwise facilitate a payment transaction. The processor 401 of the mobile communication device 400 may execute the mobile payment application or a processor included as part of the contactless element 407 may operate the mobile payment application. The mobile payment application may access a data storage element 405 to obtain data used to participate in a payment transaction or to record or update a data record for a transaction. Additionally, the mobile payment application may access a secure memory that is part of the contactless element 407. Furthermore, the data stored in the secure memory may be encrypted to provide further security. The mobile payment application may communicate and exchange data with other elements of device 400 as the result of an application programming interface (API) or other suitable form of interface, or as a result of interactions with a controller or application that functions to receive data inputs from a consumer and provides the received data to the mobile payment application.

Figure 5:
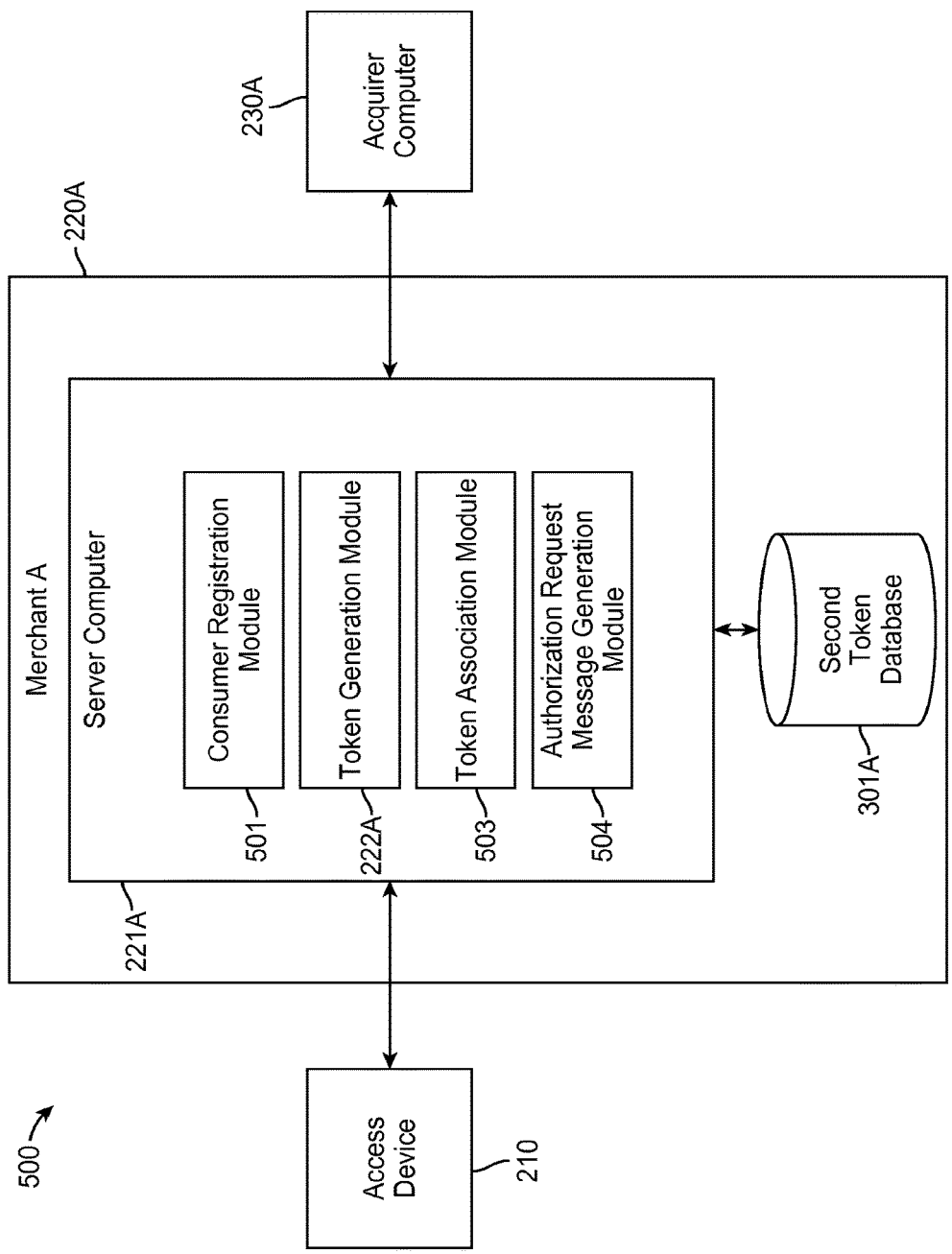
FIG. 5 depicts a block diagram illustrating a merchant including functional aspects of the merchant.

FIG. 5 depicts a block diagram illustrating a merchant 220A including functional modules of the merchant server computer 221A. Other entities (access device 210 and acquirer server computer 231A) in a portion of the transaction processing system 500 are displayed as well. Each merchant server computer 221A may not contain all of the functionality described in the server computer 221A depending on the embodiment of the multiple tokenization authentication process being implemented.

The merchant 220A may comprise a server computer 221A and, in some embodiments, a second token database 301A. The server computer 221A of the merchant 220A may comprise a consumer registration module 501, a token generation module 222A, a token association module 503, and an authorization request message generation module 504. The modules may interact and/or communicate with one another. Additionally, the modules may include any necessary components or software in order to perform their function or functions. Computer code for performing the functions of the above-described modules may be present on a computer readable medium that causes a processor to execute the function. Note that these each and every module may not be used or required in each embodiment. For example, the token association module 503 is only used in the embodiment that stores a second token 204 at the merchant 220A.

In some embodiments, a consumer registration module 501 may be used by the server computer 221A during a registration phase to capture and store consumer information related to the multiple token authentication. The consumer registration module 501 may be invoked the first time a consumer registers for the multiple token authentication service. The consumer may be provided with an option to use the multiple token authentication or the merchant 220A may require the consumer to register for the multiple token authentication. The consumer registration module 501 may store consumer information at the merchant 220A or may communicate with the acquirer 230A to store account and personal information at the acquirer 230A. For example, the embodiment of the multiple token authentication that generates a new second token 204 for every consumer transaction may have a consumer registration process where no actual consumer data is stored at the merchant 220A. Instead, the consumer registration module 501 may communicate with the acquirer 230A to gather consumer information including the account identifier 207 that will be used in future transactions and store this information at the acquirer 230A.

Although FIGS. 2 and 5 do not show an embodiment implementing token validation as will be discussed in more detail in FIGS. 6-9, a token validation module (not shown) may be implemented in some embodiments to provide further security to a first token 201. Although this embodiment is not shown in FIGS. 2 and 3, it may be included in all embodiments of the multiple tokenization authentication. The token validation module would operate in the current embodiment in the same manner as that described below in regards to the token validation module included in embodiments described by FIGS. 6-9 below.

The token generation module 222A may be used by the server computer 221A to generate the second token 204. In some embodiments, the second token 204 is generated during every transaction based on the first token 201. In other embodiments, the token generation module 222A is only used during a consumer registration phase and the second token 204 is stored in a second token database 301A for later use in the multiple tokenization authentication process.

The token association module 503 may be used by the server computer 221A in some embodiments to determine a second token 204 that is associated with a first token 201 provided by the consumer. For example, a consumer may provide a first token 201 that is associated with a second token 204. As explained above in the description of the second token database, there are many methods for determining the association.

The authorization request message generation module 504 may be used by the server computer 221A to generate an authorization request message comprising the second token 204. The second token 204 could be included in the authorization request message in any suitable manner. For example, the second token 204 could be stored in the format of a payment card number such that the multiple tokenization authentication process could be implemented on existing infrastructure. Accordingly, after generating the authorization request message comprising the second token 204, the authorization request message would be sent to the acquirer computer 230A associated with the merchant. The acquirer computer 230A may then receive the authorization request message and process the multiple tokenization authentication process as described in further detail below.

The second token database 301A may store a second token 204 generated during a registration phase for each consumer. The second token 204 may be stored according to a consumer identifier or through any other information that allows the server computer 221A to easily retrieve an associated second token 204 to a first token 201. As explained above, the token association module 503 may access information stored at the second token database 301A to determine an associated second token 204.

The access device 210 may be in any suitable form. Examples of access devices include point of sale (POS) devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like. The access device 210 may be operated by the consumer or the merchant 220A.

The acquirer computer 230A may be the second entity according to the exemplary embodiment shown in FIG. 2. The acquirer computer may be a server computer 221A and may comprise any and all of the features described in further detail below.

Figure 6:
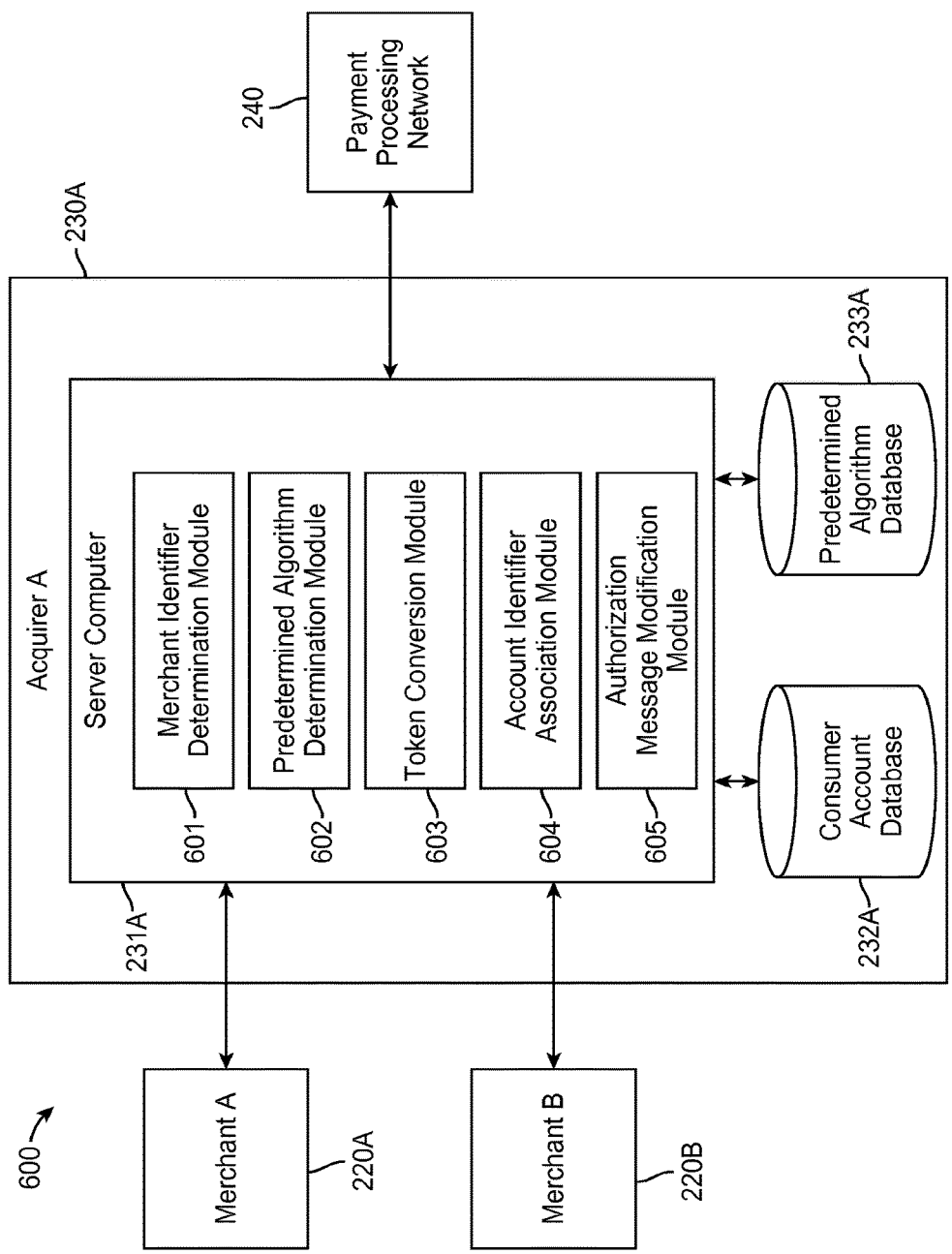
FIG. 6 depicts a block diagram illustrating an acquirer including functional aspects that may be comprised within a server computer located at the acquirer.

FIG. 6 depicts a block diagram illustrating a second entity (in this case an acquirer 230A) including functional aspects that may be comprised within a server computer 231A located at the second entity (acquirer 230A). The server computer comprises a merchant identifier determination module 601, a predetermined algorithm determination module 602, a token conversion module 603, an account identifier 207 association module 604, and an authorization message modification module 605. The modules may interact and/or communicate with one another. Additionally, the modules may include any necessary components or software in order to perform their function or functions. Computer code for performing the functions of the above-described modules may be present on a computer readable medium that causes a processor to execute the function. The modules may interact with a consumer account database 232A and a predetermined algorithm database 233A while performing their intended functions.

The merchant identifier determination module 601 may be used by the server computer 231A to determine a merchant identifier that the second token 204 may be derived from or may be comprised in the second token 204. For example, the server computer 231A may receive a second token 204 in an authorization request message from the merchant 220A. The server computer 231A would extract the second token 204 from the authorization request message using any suitable method. The server computer 231A may then use the merchant identifier determination module 601 to determine a merchant identifier from the second token 204. For example, the second token 204 may have predetermined data elements that may comprise the merchant identifier in any given second token 204 or authorization request message. The acquirer may inform all the merchants 220A-220B that it is associated with to include a determined merchant identifier associated with the merchant 220A during a merchant registration. The acquirer could inform the merchant 220A that the merchant identifier should be provided in the same portion of the second token 204 or the authorization request message for all transactions. Additionally, the authorization request message could include a flag informing the acquirer that the message is requesting multiple tokenization authentication so that the acquirer server computer 231A will initiate the merchant identifier determination module 601 whenever that flag is received. Alternatively, the acquirer may always use the merchant identifier determination module 601 to determine whether any message it receives is trying to use multiple tokenization authentication. Accordingly, the merchant identifier determination module 601 may always inspect a particular portion of the second token 204 or authorization request message and determine whether a merchant identifier is present or not. The merchant identifier determination module 601 may determine whether a merchant identifier exists by extracting the corresponding data and electronically searching a predetermined algorithm database 233A to determine if a stored merchant identifier matches the received merchant identifier. The merchant identifier data may be designed such that regular transaction data would not accidentally be associated with a merchant identifier stored on the system.

The predetermined algorithm determination module 602 may be used by the server computer 231A to determine a predetermined algorithm that is associated with the merchant identifier determined by the merchant identifier determination module 601. The predetermined algorithm determination module 602 uses the received merchant identifier to electronically search a predetermined algorithm database 233A for a corresponding predetermined algorithm that was determined during registration of the merchant 220A with the acquirer 230A. During merchant registration, the predetermined algorithm may be shared between the acquirer 230A and the merchant 220A such that the merchant 220A may use the predetermined algorithm when generating a second token 204 by altering a first token 201. The second token 204 may then be transmitted to the acquirer 230A and may be converted into a recognizable value using the predetermined algorithm.

The predetermined algorithm database 233A may store predetermined algorithms for converting second tokens 204 into recognizable values as described above, as well as merchant identifiers that correspond to the predetermined algorithm. The predetermined algorithm database 233A may also comprise other information about registered merchants 220A-220B. Accordingly, the predetermined algorithm database 233A may be used to determine whether a merchant identifier corresponds to a registered merchant 220A or not. If the merchant identifier is not recognized then the authorization request message may be processed as a typical transaction that is not requesting multiple tokenization authentication. However, if the authorization request message comprises a flag informing the acquirer that multiple tokenization authentication is being requested but the merchant identifier is not recognized, the transaction may be denied.

The token conversion module 603 may be used by the server computer 231A once the predetermined algorithm is determined. The token conversion module 603 may use the predetermined algorithm to convert the second token 204 into a recognizable value associated with the first token 201. The recognizable value may be associated with the first token 201 through any suitable means. This association may arise from a stored value in the consumer account database 232A corresponding to the recognizable value in part or in entirety. In such a case, the recognizable value may be used to electronically search a consumer account database 232A for the account identifier 207. For example, a first token 201 may include a portion of a phone number of a consumer. The second token 204 may be generated by hashing portions of the phone number according to a predetermined algorithm. The acquirer 230A may use the token conversion module 603 to determine the phone number by applying the predetermined algorithm to the second token 204 to determine the portions of the phone number included in the second token 204. Accordingly, the recognizable value may be a portion of the phone number that is associated with the first token 201.

The account identifier association module 604 may be used by the server computer 231A once the one or more recognizable values are determined by the token conversion module 603. The account identifier association module 604 may electronically search the consumer account database 232A to determine an account identifier 207 associated with the one or more recognizable values. The recognizable values may only be a portion of a consumer's information. For example, the recognizable value may only be the last four digits of a consumer's phone number. As such, the account identifier association module 604 may electronically search the consumer account database 232A to determine an account identifier 207 that is associated with a consumer with a phone number comprising the recognizable value (the last four digits). The one or more recognizable values may comprise different types of data as well. For example, the data may comprise both the last four digits of the consumer's phone number as well as the consumer's zip code. In this manner, if two consumer's have the same last four digits of a phone number, the zip code information will most likely distinguish the two consumers from one another. Accordingly, depending on the type of multiple token authentication implemented, the system may examine the consumer records and design a predetermined algorithm that will ensure that no consumer will be mistaken for another during a multiple tokenization authentication process. In this manner, the account identifier association module 604 may determine an account identifier 207 that is associated with the consumer.

The consumer account database 232A may store account identifiers 207 corresponding to registered consumers with the merchant 220A or acquirer. The account identifiers 207 may be stored along with consumer personal information or other information provided during a registration phase of data that may be contained in the first token 201. For example, a consumer may provide a phone number, billing address, and primary account number for a payment account during a registration phase. An account identifier 207 may be created that identifies the consumer to the acquirer 230A. The account identifier 207 may be the primary account number or may be derived from the primary account number. The registration process may be implemented either through the merchant 220A or directly with the acquirer 230A through a consumer registration module 501 as explained above in reference to the merchant server computer 221A of FIG. 5. Accordingly, the consumer registration module 501 may save the consumer's account number, personal information, first token 201, or any other information that may be used during the multiple tokenization authentication process in the consumer account database 232A and associate the information to an account identifier 207.

The authorization message modification module 605 is used by the server computer 231A once an account identifier 207 has been determined. The authorization message modification module 605 receives the account identifier 207 from the account identifier association module 604 and modifies the received authorization request message from the merchant 220A to include the account identifier 207. The account identifier 207 may be added to the authorization request message or may replace the second token 204 in the authorization request message. In embodiments where the second token 204 is in the format of a payment card number, the second token 204 may be replaced with the account identifier 207 may be the consumer's payment card number and may replace the second token 204 in the authorization request message. Accordingly, when the modified authorization request message is sent to a payment processing network 240, the payment processing network 240 will process the authorization request message as any other transaction. The payment processing network 240 may not receive any indication that the authorization request message ever included a second token 204. Accordingly, the multiple tokenization authentication process described herein may be implemented using existing payment transaction system infrastructure.

Figure 7:
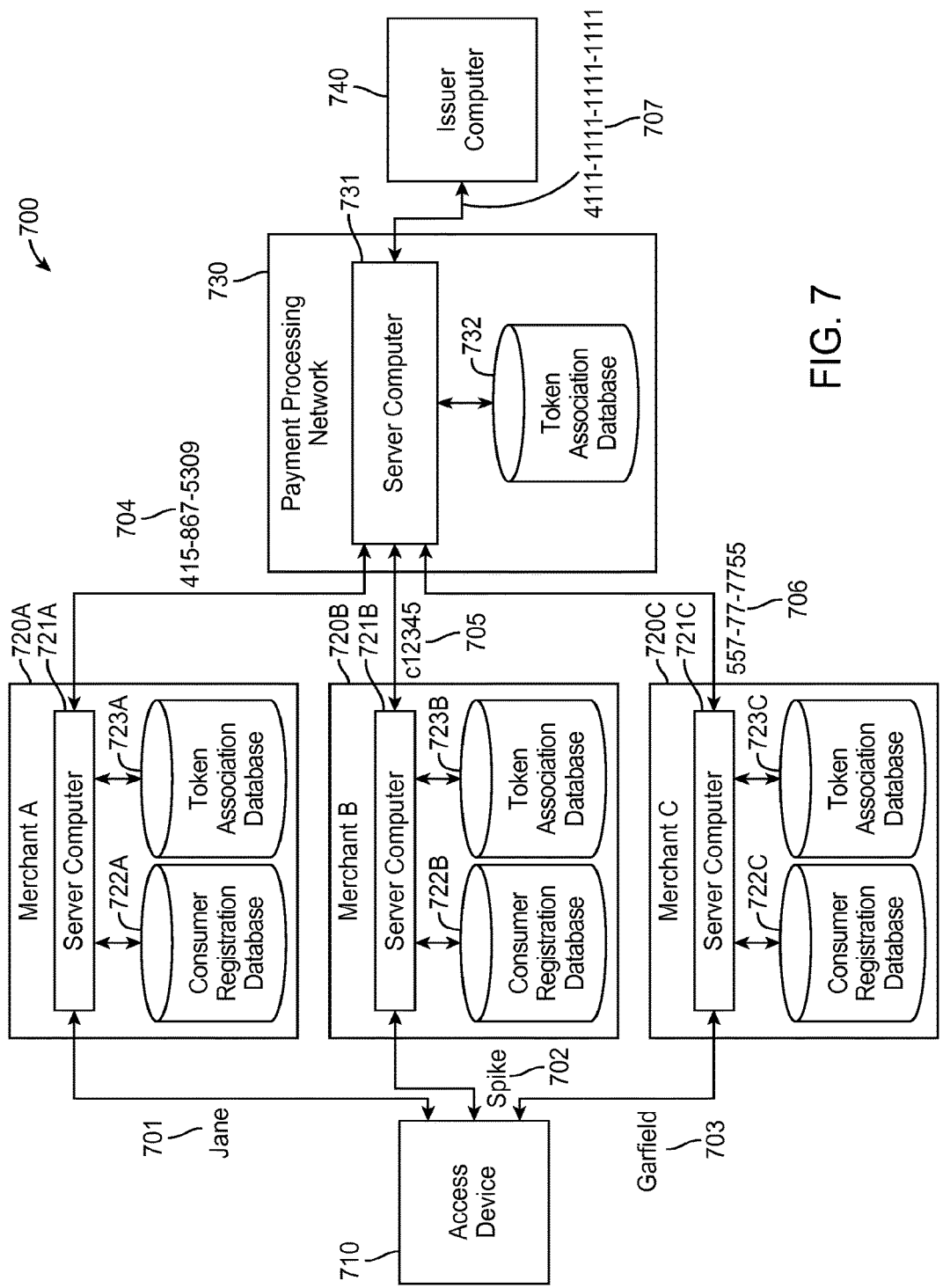
FIG. 7 depicts a block diagram illustrating a transaction processing system configured to authenticate a consumer using multiple tokenization wherein the second token may not be generated using information contained in the first token.

Another embodiment of the multiple tokenization authentication process may use second tokens 704-706 that are not derived from the first token 701-703 but may be associated with consumer information and associated during a registration process instead. FIG. 7 illustrates one exemplary embodiment of such a multiple tokenization process. This embodiment of the multiple tokenization authentication process allows for easy transaction processing for consumers. Consumers may not need a portable consumer device at all as they may only need to remember a simple first token 701 to initiate a transaction. For example, the first token 702 could be the name of their first dog. The consumer may even be provided with a hint or challenge-response type of prompt in order to help the consumer remember what their first token is for that particular merchant 720A. The consumer may implement different first tokens 701-703 for each of the merchants 720A-720C that utilize a multiple tokenization authentication so that employees or owners at one merchant 720A may not use the first token 701 to initiate unauthorized transactions at other merchants 720B-720C. Although embodiments of the multiple tokenization authentication process described in FIG. 7 may need the merchant 720A to store some consumer information, the consumer information may not be sensitive and the second token 704 stored at the merchant 720A may be encrypted so that any malicious party may not access the data. Accordingly, this embodiment is still secure and protects sensitive consumer information from data breaches by employees and owners of merchants 720A-720C as well as third parties.

FIG. 7 depicts a block diagram illustrating a transaction processing system 700 configured to authenticate a consumer using multiple tokenization wherein the second token 704 may not be generated using information contained in the first token 701. The system depicted in FIG. 7 is configured to allow a consumer to provide minimal information at the time of the transaction for ease of the consumer and protects consumers from merchants 720A-720C (or their employees) who may take a consumer's financial information to charge unauthorized transactions. The server computer 721A-721C at the merchant 720A-720C is not allowed to store or gain access to any account information so that an employee at the merchant 720A cannot gain access to a consumer's sensitive information. Even if the merchant 720A stores sensitive information, the sensitive information may be encrypted and employees and owners are not allowed access to the sensitive information. The information may be accessed by a computer system when generating authorization request messages only. For example, if a consumer provides a merchant 720A with their phone number (sensitive information) during a registration stage, the phone number may be encrypted and stored in a token association database. If a corresponding token is received during a transaction such that the phone number should be sent to a payment processing network 240, the server computer 721A will generate an authorization request message using the phone number without displaying, printing, or allowing the merchant 720A access to the phone number. Furthermore, when an authorization response message is received displaying whether the transaction is approved or not, the phone number may be converted back to the first token 701 provided by the consumer or other non-sensitive information may be printed to inform the merchant 720A and the consumer that the transaction is approved without compromising the sensitive information contained in the second token 704.

The merchants 720A-720C are first entities in this exemplary embodiment of the multiple tokenization authentication process. These merchants 720A-720C may be the same as the merchants described in reference to FIGS. 2 and 3 but may comprise additional modules in their server computers 721A-721C and may comprise a consumer registration database 722A as well. Because all of the merchants shown in FIG. 7 comprise the same functionality, the capabilities of the merchants will be discussed with reference to a single merchant, merchant A 720A. Merchant A 720A may comprise a server computer 721A, a consumer registration database 722A, and a token association database 723A.

According to this embodiment, the first token 701 can include information associated with the consumer that is less sensitive than, e.g. the consumer's primary account number for the payment account. For example, the first token 701 can include information such as a pet's name, a mother's maiden name, the first street on which the consumer lived, a childhood nickname, a best friend's name, a name of the consumer's high school, a word or phrase arbitrarily chosen by the consumer, an email address of the consumer, a work password, etc. The consumer may be prompted by the merchant 720A to provide their first token 701 during the consumer registration process such that the first token 701 may be associated with a second token 704. The second token 704 may be generated during consumer registration but may or may not be generated by altering data in the first token 701. For example, if the first token 702 provided by the consumer is the name of the consumer's first dog, "Spike," the second token 705 could be any type of information and does not have to be related to "spike" or generated using "spike." For example, the second token 705 could be an arbitrary number, a phone number of the consumer, or any other data stored in the token association database 723A. The second token 705 may also be sent to a payment processing network 730 to be stored for future reference along with an account identifier 707 that corresponds to the consumer's account information with a payment account issued by an account issuer 740. The second token 705 could be consumer identifiable (phone number, etc.) or could be unidentifiable (a series of letters and numbers that are not easily recognizable or memorized).

Another example, may be that the first token 701 is the name of a consumer's daughter, "Jane." The second token 704 may be determined to be the phone number of the consumer. Accordingly, the second token 704 is not generated using the first token 701 but they are associated through the consumer providing both pieces of information during the registration process. Finally, another first token 703 may be the answer to a question, what is your first cats name? The consumer's first token 703 may be "Garfield." Accordingly the merchant server computer 721A may use the consumer's social security number as the second token 706. The second token 706 is much more sensitive than the first token 703 but is still less sensitive than the consumer's transaction account number. Furthermore, as before, the second token 706 is not generated using information contained in the first token 703 and instead is associated with the consumer through a registration process.

The consumer registration database 722A may be used by the server computer 721A during a registration phase to capture and store consumer information related to the multiple token authentication. Consumer information may also comprise a consumer identifier that is stored in the consumer registration database 722A such that a token validation can occur. The consumer identifier may include a consumer number, date of registration, particular consumer personal information, or other data that may be provided to further secure the multiple tokenization authentication.

The token association database 723A may be used to store consumer information related to the first token 701 and second token 704 association process of the multiple tokenization authentication process as described above. The consumer information may comprise a first token 701 and a second token 704 that will be associated and stored in a token association database 723A.

The payment processing network 730 may be any network of computers that is configured to process transactions. The payment processing network 730 may be determined according to a payment processing network indicator included in the second token 704 or may be included in the consumer registration database 722A. The capabilities and functionality contained in the payment processing network 730 will be described in further detail below.

The server computer 731 located at the payment processing network 730 may be coupled to a token association database 732 that may store a second token 704 and an account identifier 707 corresponding to the second token 704. The second token 704 and account identifier 707 may be stored at the token association database 732 of the payment processing network 730 during a registration phase as described above. The payment processing network 730 may receive an authorization request message comprising the first token 701. The payment processing network 730 may then determine the first token 701 from the authorization request message and may search a token association database 732 to determine an associated account identifier 707 with the second token 704.

The token association database 732 may be coupled to the server computer 731 and may store a second token 704 and an account identifier 707. The token association database 732 may be accessed by the server computer 731 and return an account identifier 707 associated with a received second token 704 by the server computer 731 of the payment processing network 730.

The payment processing network 730 may receive the authorization request message with the second token 704 and determine whether the second token 704 is valid. For example, the payment processing network 730 may determine whether the second token 704 is associated with an account identifier 707. If the second token 704 is not valid, the payment processing network 730 may return an authorization response message to the merchant 720A declining the transaction.

If the second token 704 is valid, the payment processing network 730 accesses the account identifier 707 associated with the second token 704 and modifies the authorization request message to include the account identifier 707. The payment processing network 730 provides the modified authorization request message with the account identifier 707 to the issuer. From this point, a typical transaction authorization process can occur, as described in FIG. 1.

Figure 8:
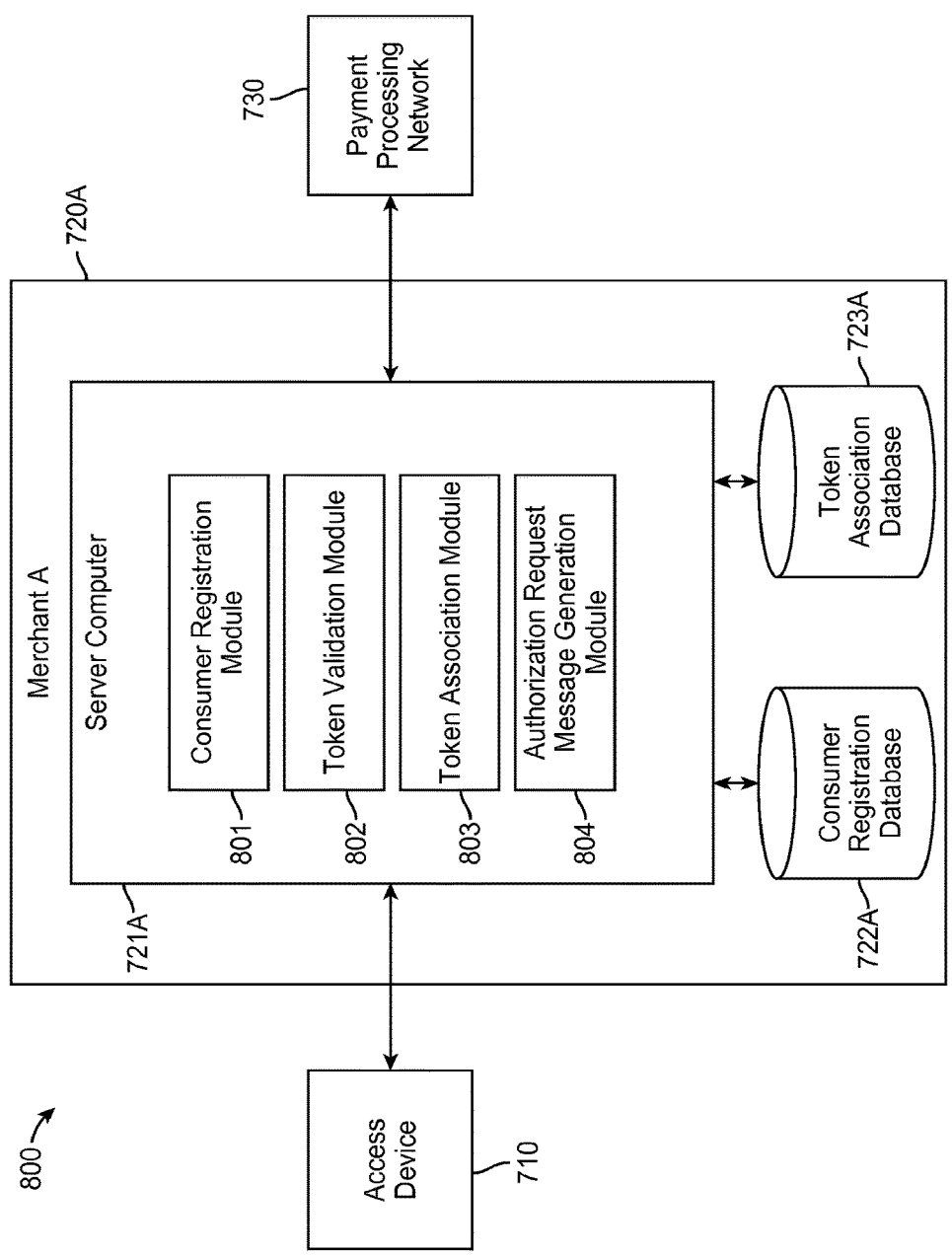
FIG. 8 depicts a block diagram illustrating a transaction processing system configured to authenticate a consumer using multiple tokenization wherein the second token may be generated using information not contained in the first token according to an exemplary embodiment.

FIG. 8 depicts a block diagram illustrating a transaction processing system configured to authenticate a consumer using multiple tokenization wherein the second token 704 may be generated not using information contained in the first token 701. The block diagram shows functional aspects of the merchant 720A including functional modules used in the multiple tokenization authentication process.

The merchant 720A may include a server computer 721A, a consumer registration module 801, a token validation module 802, a token association module 803, and an authorization request message generation module 804. The modules may interact and/or communicate with one another. Additionally, the modules may include any necessary components or software in order to perform their function or functions. Computer code for performing the functions of the above-described modules may be present on a computer readable medium that causes a processor to execute the function.

The consumer registration module 801 may be used by the server computer to register new consumer's to use the multiple tokenization authentication process. The consumer registration module 801 may operate similarly to the consumer registration module 501 described above in reference to FIG. 5 but the consumer registration module 801 may save a second token 704 that is associated with the first token 701 to the token association database 723A. The second token 704 may not necessarily be derived from the first token 701. The association between the first token 701 and second token 704 may be created through the registration phase where the consumer or the merchant 720A determines the corresponding association instead of the second token 704 being generated through the information contained in the first token 701. For example, the first token 702 may be the name of the consumer's first dog, "spike." The registration database would store the first token 702, spike, and would also determine a second token 705 to associate with the consumer. The second token 705 may be more sensitive than the first token 702 and as such, may be personal information related to the consumer or may not be sensitive and instead is a random number or other information. However, the second token 705 may not necessarily be created by using the information contained in the first token 702, spike. For example, the consumer registration module 801 may create a second token 705 based on the consumer's phone number. Additionally, the consumer registration module 801 could make up a consumer number to use as the second token 705. For example, the second token 705 could be c12345. The second token 705 is not created using spike but is still associated with the consumer through the registration associating the two tokens during the registration phase. Finally, even more sensitive information could be stored, such as a social security number. If the token association database 723A is breached and an unauthorized or malicious entity gains access to the token association database 723A, the second token 704 may not be able to be used by unauthorized entities to use transactions because each merchant 720A may create their own second token 704 that is different than any other merchant 720B-720C. Accordingly, malicious merchants 720A-720C or merchant 720A employees may not steal consumer information to be used at other merchants 720B-720C. Accordingly, the system is secure because account identifiers 707 are not provided by the consumer except during a registration phase that is operated by the acquirer. Accordingly, in embodiments of the invention, the merchant 720A may not gain access to the second token 704 stored in the token association database 723A. The second token 704 may be encrypted and the authentication process may be ran by computers such that any employee, owner, or third party at a merchant 720A would never gain access to the second token 704.

The token validation module 802 may be used by the server computer 721A as an additional security measure in some embodiments of the multiple tokenization authentication process. Because embodiments of the invention initiate transactions with the mere knowledge of a single first token 701, the system may be susceptible to unauthorized fraudulent transactions if a third party gains access to the first token 701. Accordingly, it may be beneficial to prompt the consumer to provide a consumer identifier as well as the first token 701 in order to verify that the presenter of the first token 701 is in fact the corresponding consumer. As explained above, the token validation module 802 may cause the merchant 720A to receive and store a consumer identifier from the consumer. The server computer 721A would then use the token validation module 802 to determine whether the first token 701 is associated with the consumer identifier.

The token validation module 802 may determine if the first token 701 is associated with the consumer identifier by electronically searching a consumer registration database 722A for a first token 701 that corresponds to a consumer identifier. The consumer registration database 722A may store first tokens 701 by consumer identifier to facilitate easy searching by consumer identifier or could store the first tokens 701 by any other consumer information that allows the token validation module 802 to determine whether the received first token 701 matches a stored first value associated with the received consumer identifier. Finally, in embodiments implementing a token validation module 802, the server computer 721A would continue the process of determining the second token 704 associated with the consumer identifier if the first token 701 is associated with the consumer identifier. If the received first token 701 is not associated with the received consumer identifier, the token validation module 802 may end the transaction in order to limit unauthorized transactions.

The token association module 803 may be used by the server computer 721A to determine the second token 704 associated with the first token 701 received from the consumer. The token association module 803 may electronically search the token association database 723A to find the associated second token 704 that corresponds to any first token 701 that matches the received token 701. Accordingly, the token association database 723A would return to the token association module 803 the second token 704 that was stored with the matching first token 701 in the database.

The authorization request message generation module 804 would be used by the server computer 721A to generate an authorization request message comprising the second token 704. The second token 704 could be included in the authorization request message in any suitable manner. For example, the second token 704 could be stored in the format of a payment card number such that the multiple tokenization authentication process could be implemented on existing infrastructure. Accordingly, after generating the authorization request message comprising the second token 704, the authorization request message would be sent to the payment processing network 730 indicated as associated with the consumer during the registration phase. The payment processing network 730 may then receive the authorization request message and process the multiple tokenization authentication process as described in further detail below.

Figure 9:
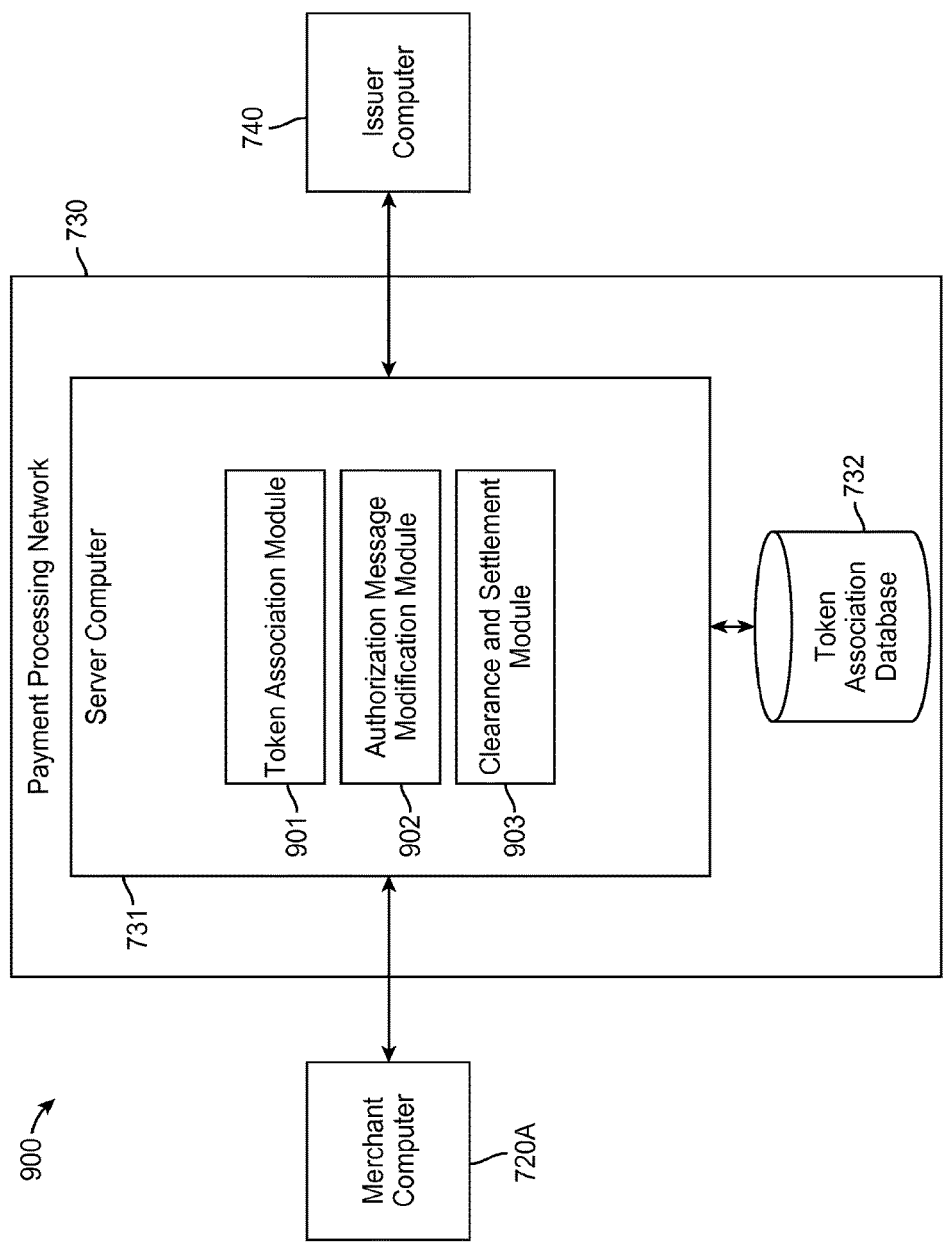
FIG. 9 depicts a block diagram illustrating an exemplary embodiment of a payment processing network in a portion of a transaction processing system

FIG. 9 depicts a block diagram illustrating an exemplary embodiment of a payment processing network 730 in a portion of a transaction processing system 900 including a payment processing network 730, a merchant computer 720A, and an issuer computer 740. An acquirer computer that may be located between the payment processing network 730 and the merchant computer 720A is not shown in the interest of simplicity.

The payment processing network 730 may comprise a server computer 731 coupled to a token association database 732. The server computer 731 of the payment processing network 730 may comprise a token association module 901, an authorization message modification module 902, and a clearance and settlement module 903. The modules may interact and/or communicate with one another. Additionally, the modules may include any necessary components or software in order to perform their function or functions. Computer code for performing the functions of the above-described modules may be present on a computer readable medium that causes a processor to execute the function.

The token association module 901 may be used by the server computer 731 to determine the account identifier 707 associated with the second token 704 received from the merchant 720A. The token association module 901 may electronically search the token association database 732 to find the associated account identifier 707 that corresponds to any second token 704 in the database that matches the received second token 704. Accordingly, the token association database 732 would return to the token association module 901 the account identifier 707 that was stored with the matching second token 704 in the database.

The token association database 732 may be used to store consumer information related to the second token 704 and account identifier association process of the multiple tokenization authentication process as described above. The consumer information may comprise a second token 704 and a corresponding account identifier 707.

The authorization message modification module 902 may be used by the server computer once an account identifier 707 has been determined. The authorization message modification module 902 receives the account identifier 707 from the token association module 901 and modifies the received authorization request message from the merchant 720A to include the account identifier 707. The account identifier 707 may be added to the authorization request message or may replace the second token 704 in the authorization request message. In embodiments where the second token 704 is in the format of a payment card number, the second token 704 may be replaced with the account identifier 707 may be the consumer's payment card number and may replace the second token 704 in the authorization request message. Accordingly, when the modified authorization request message is sent to the account issuer 740 corresponding to the account identifier 707, the account issuer 740 may process the authorization request message as any other transaction. The account issuer 740 may not receive any indication that the authorization request message ever included a second token 704. Accordingly, the multiple tokenization authentication process described herein may be implemented using existing payment transaction system infrastructure.

Note that authorization message modification module 902 may also be used to modify an authorization response message received from the account issuer 740 once the authorization decision has been made. For example, a similar process to that described above may occur to replace the account identifier 707 in the authorization response message with the second token 704 so that the merchant 720A will not gain access to the sensitive account information after the transaction has been approved or declined.

The clearance and settlement module 903 is a typical module that the server computer 731 may use during any transaction. This module organizes the settlement process of consumer accounts between acquirer computers (not shown) and issuer computers 740. The clearance and settlement module may be used by the server computer after an authorization response message is received from the account issuer 740 that informs the payment processing network 730 that the transaction is approved and the consumer has been successfully authenticated using the multiple tokenization authentication process.

II. Exemplary Methods of Multiple Token Authentication

Figure 10:
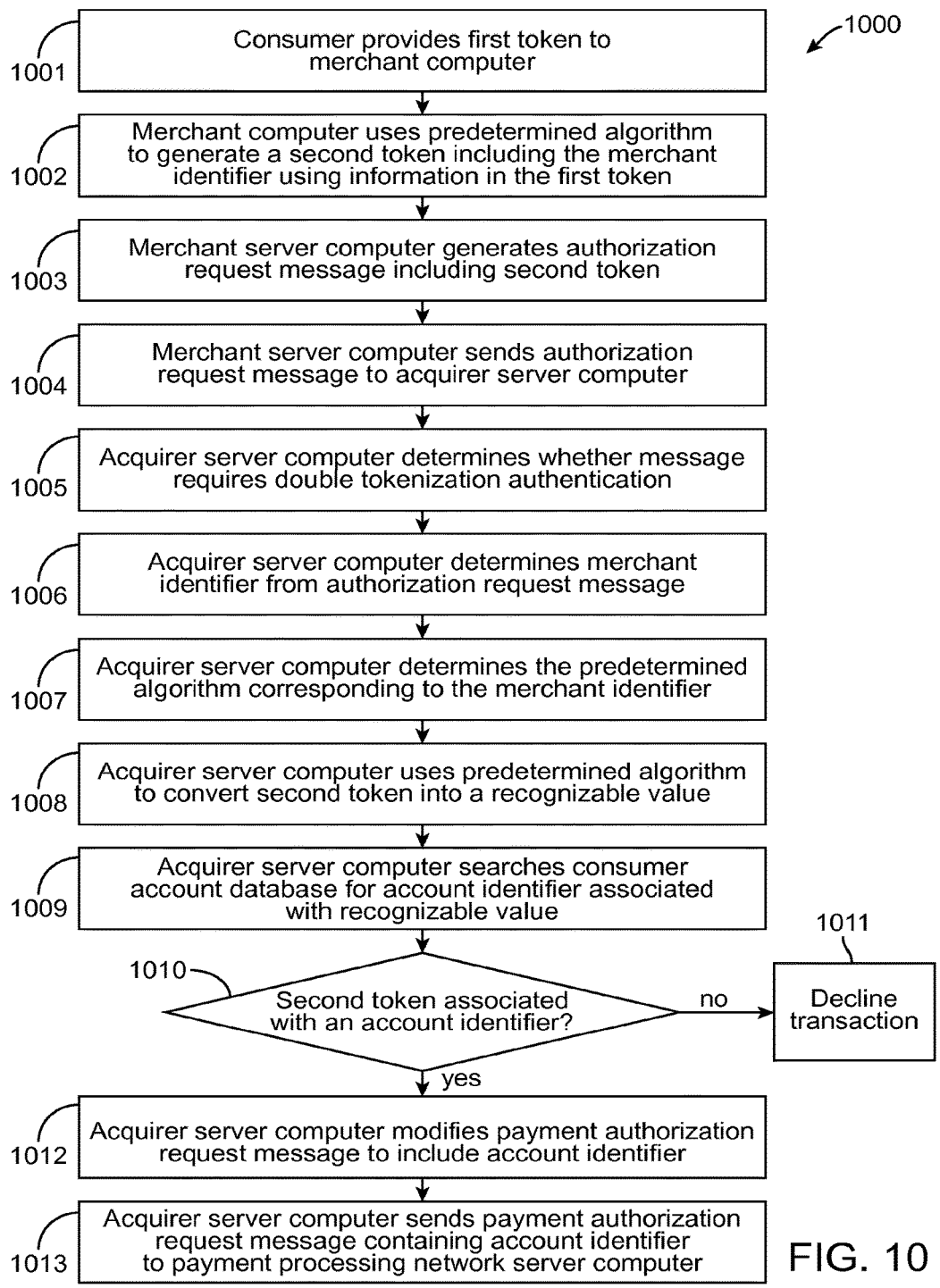
FIG. 10 depicts a flow diagram illustrating a method of using multiple tokenization for authentication according to one embodiment of the invention where no consumer data is stored at the merchant.

FIG. 10 shows a flow diagram illustration a method 1000 of using multiple tokenization for authentication according to one embodiment of the invention where no consumer data is stored at the merchant. In this exemplary embodiment a transaction is occurring between a consumer and a merchant associated with an acquirer. Therefore, in this exemplary embodiment, the merchant is a first entity and the acquirer is a second entity. However, a similar process could occur between any two other entities facilitating a transaction.

In step 1001, the consumer provides a first token to a merchant server computer. The merchant server computer receives the first token from the consumer. The consumer may provide the first token to the merchant server computer in any suitable manner. For example, in the context of a grocery store, the consumer may be prompted to enter their first token when the groceries have been rung up by a cashier. The consumer may swipe a card comprising their first token, swipe a mobile phone comprising a mobile payment application configured to provide the first token, or may manually enter their information into a POS device located at the merchant. The consumer may enter the same information at every merchant or may have different first tokens for every merchant. For the embodiment shown in FIG. 10, the consumer may provide at least one piece of personal information in the first token. For example, the consumer may provide their phone number and zip code through any suitable manner. Assuming the first token is provided through a POS access device located at the merchant, the POS display could ask for the consumers token or could specifically ask for the particular token information the merchant may use to generate a second token. For example, the POS device could ask the consumer to enter their phone number and zip code.

In step 1002, the merchant server computer determines a second token associated with the first token. The second token is determined by the merchant server computer receiving the first token and determining the type of information contained in the first token. Assuming, appropriate information has been provided by the consumer, the merchant server computer uses a predetermined algorithm to generate a second token. The second token may be derived or may include the merchant identifier of the merchant generating the second token. The second token is generated by altering information in the first token according to a predetermined algorithm. For example, the predetermined algorithm may instruct the merchant to use the first three digits of the consumer's phone number at data positions 2-5, the first four digits of the zip code as data positions 8-11, etc. The predetermined algorithm is shared between the merchant and acquirer such that they both have access to the particular algorithm being applied.

In step 1003, the merchant server computer generates an authorization request message including the second token. After the second token has been generated, the merchant server computer generates an authorization request message and includes the generated second token in the authorization request message. Authorization request messages are typically used in payment transactions. The generated authorization request message may be generated using the same protocol or standards as typical authorization request messages the system typically sends to acquirers, payment processing networks, and account issuers in order to process a transaction. Accordingly, the second token may be sent to the acquirer using preexisting infrastructure already being implemented in payment transaction systems.

In step 1004, the merchant server computer sends the second token to a server computer at an acquirer. As explained in the prior step, the merchant server computer may send the second token in an authorization request message to the acquirer server computer.

In step 1005, the acquirer server computer determines whether the authorization request message requires multiple tokenization authentication. The acquirer server computer may make this determination in any suitable manner. For example, the authorization request message may comprise a flag informing the acquirer computer that multiple tokenization authentication is required. Additionally, a merchant identifier used to derive the second token may inform the acquirer that the merchant is implementing multiple tokenization authentication. No matter how the acquirer determines whether the message requires multiple tokenization authentication, the acquirer may decide whether to apply multiple tokenization authentication or to process the transaction as a typical payment transaction.

In step 1006, the acquirer server computer determines the merchant identifier from the authorization request message. The acquirer and merchant may have determined prior to the sending of the authorization request message, a predetermined position that the merchant identifier will be located. Any manner of informing the acquirer computer of where to extract the merchant identifier from the authorization request message may be used. In some embodiments, this server computer may determine the merchant identifier before determining whether the authorization request message is requesting multiple tokenization authentication. As such, the steps may be inverted where the acquirer determines the merchant identifier before determining if multiple tokenization authentication is required. In this embodiment, the acquirer server computer may determine whether the merchant identifier corresponds to a merchant utilizing multiple tokenization authentication processing. If so, the acquirer computer would continue with the multiple tokenization authentication. If not, the authorization request message would be forward to a payment processing network for further processing.

In step 1007, the acquirer server computer determines the predetermined algorithm corresponding to the merchant identifier. The acquirer server computer determines the predetermined algorithm corresponding to the merchant identifier by searching a predetermined algorithm database 233A for the determined merchant identifier. The predetermined algorithm corresponding to the merchant identifier stored in the predetermined algorithm database 233A may then be returned to the server computer for conversion of the second token.

In step 1008, the acquirer server computer uses the predetermined algorithm to convert the second token into a recognizable value. The predetermined algorithm may inform the acquirer server computer which data in the second token correspond to which consumer data. For example, using the example above, the acquirer server computer may be informed to take the fifth through eighth data elements and the eighth through eleventh data elements to gain large portions of the consumer phone number and zip code. The portions of the phone number and zip code may be recognizable values that may be used to determine an associated account identifier to the second token. In this manner, the one or more recognizable values may correspond to information contained in first token.

In step 1009, the acquirer server computer searches a consumer account database for an account identifier associated with the recognizable value. Once the one or more recognizable values are determined, the acquirer computer may use the one or more recognizable values to search a consumer account database for a corresponding consumer with personal information matching those of the one or more recognizable values. For example, the acquirer server computer would search the consumer account database for a consumer that shared both the portions of the phone number and zip code matching the recognized values.

In step 1010, the acquirer server computer determines whether the second token is associated with an account identifier. The server computer may determine whether the second token is associated with an account identifier by determining whether the search of the consumer account database provided any account identifiers that corresponded to the recognizable value.

In step 1011, if the acquirer server computer determines that there is no corresponding account identifier than the transaction is declined. A denial message could be generated and returned to the merchant server computer to be forwarded or displayed to the consumer. For example, if no consumer was found with the one or more recognizable values of zip code and phone number, the determination may be that the second token is not associated with a legitimate account identifier. Accordingly, the transaction may be denied and the process may end.

In step 1012, if the acquirer server computer determines an associated with account identifier corresponding to the second token, the acquirer server computer modifies the payment authorization request message to include the account identifier. The account identifier may replace the second token or may be added to the authorization request message if there is available space within the message. For example, if the acquirer computer found an account identifier that corresponded to the portions of the phone number and zip code determined from the second token, the account number would be returned to the server computer. The server computer may then modify the received authorization request message to include the account identifier. In embodiments where the second token is in the same format as a payment card number, the account identifier may be the consumer's actual payment card number and may be substituted in for the second token. Accordingly, the multiple tokenization authentication process may be implemented on currently existing infrastructure using currently implemented payment messaging protocols.

In step 1013, the acquirer server computer sends the modified payment authorization request message containing the account identifier to the payment processing network server computer. The payment processing network server computer then processes the transaction as any typical purchase transaction authorization request message would be. This may include forwarding the authorization request message to an issuer as well as processing any authorization response message received from the account issuer.

In some embodiments, instead of generating a second token during every transaction based on the first token, the merchant may generate the second token during a registration phase and then store the second token. Furthermore, the second token may not be derived from the first token and instead may be associated with the consumer through a consumer registration process. The relationship between the first token and the second token is determined during a registration period where the consumer provides a first token and provides account information to the merchant and acquirer. The merchant, acquirer, or consumer may choose the second token to be stored at the merchant. Furthermore, the second token may be more sensitive than the first token but the second token may not be an account identifier.

Figure 11:
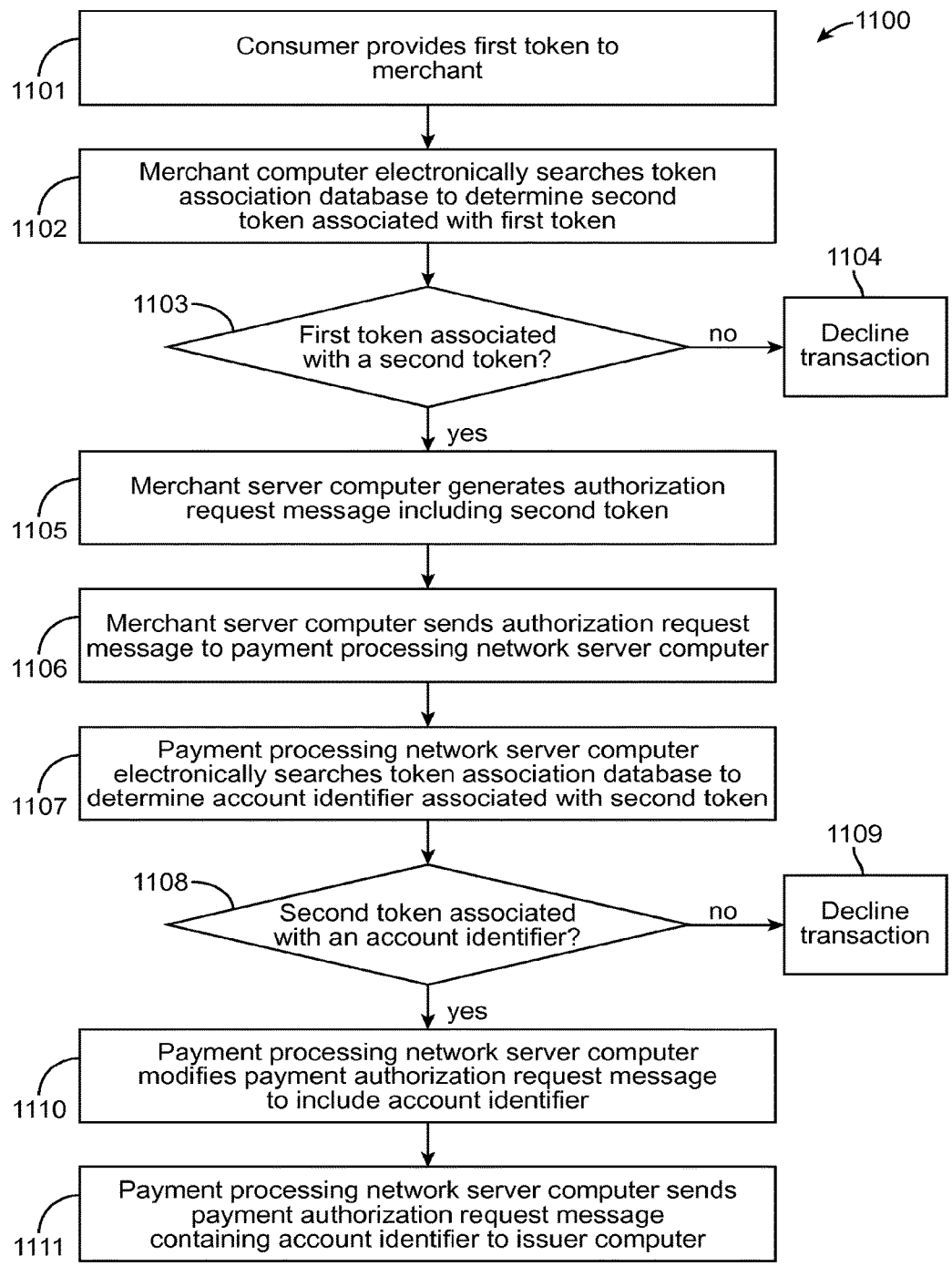
FIG. 11 shows a flow diagram illustrating a method of using multiple tokenization for authentication according to one embodiment of the invention where a second token is not derived from the first token but is stored and associated with the consumer at the merchant.

FIG. 11 shows a flow diagram illustrating a method 1100 of using multiple tokenization for authentication according to one embodiment of the invention where a second token is not derived from the first token but is stored and associated with the consumer at the merchant. Similar to FIG. 10, the present exemplary embodiment describes the method using a transaction between a consumer and a merchant associated with an acquirer. However, any other type of transaction could be used and the entities could be any suitable parties in the transaction (e.g. a bank in a person-to-person transaction, etc.)

In step 1101, the consumer provides a first token to a merchant server computer. Similar to the providing of the first token in FIG. 10 described above, the providing of the first token may be provided in any suitable manner. It is worth noting that because the second token is not generated using the first token in this embodiment, the first token may be very simple and may not be related to any account or personal information of the consumer. For example, the token may be the name of the consumer's dog.

In step 1102, the merchant server computer receives the first token and electronically searches a token association database to determine a second token associated with the first token. The second token may be generated during consumer registration, and the second token may not be generated by altering data in the first token.

In step 1103, the merchant server computer determines whether the first token is associated with a second token in the token association database. The merchant server computer may search the token association database using the first token and the token association database may return a second token that is stored according to a matching first token. For example, if the first token is "spike," the token association database would return the second token that is stored with the first token "spike." It may be that the second token generated when during the consumer's registration was c12345 because the consumer was the 12,345 consumer to register for the multiple tokenization authentication process. When the merchant server computer searches the token association database, the first token spike would return a second token of c12345.

In step 1104, if the first token is not associated with a second token in the token association database, the transaction is declined by the merchant. Accordingly, if no first token is determined to match the received first token than no second token may be returned and the transaction may be denied.

In step 1105, the merchant server computer generates an authorization request message including the second token associated with the first token. The merchant may not be given access to the second token and instead the system may automatically generate the authorization request message once the second token is determined. Additionally, the second token may be encrypted in the database so that even if access were provided, the merchant may not determine the contents of the second token.

In step 1106, the merchant server computer sends the authorization request message to the payment processing network server computer. The authorization request message may be relayed through an acquirer server computer if no direct connection exists between the merchant server computer and the payment processing network server computer.

In step 1107, the payment processing network server computer receives the authorization request message and extracts the second token. The payment processing network server computer electronically searches a token association database to determine an account identifier associated with the second token. During the registration process, the consumer's account information was provided and stored in the payment processing network along with the second token. Accordingly, the merchant may search for the account identifier corresponding to the second token received and if the consumer is registered with the payment processing network, an account identifier corresponding to the consumer's account may be returned.

In step 1108, the payment processing network server computer determines whether a second token is associated with an account identifier. Accordingly, the consumer account database may electronically searched for the account identifier corresponding to the second token received from the merchant computer.

In step 1109, if there is no account identifier associated with the second token, the payment processing network server computer declines the transaction.

In step 1110, if an account identifier associated with the second token is determined, the payment processing network server computer modifies the payment authorization request message to include the account identifier. Similar to the authorization request message being modified in relation to FIG. 10 above, the second token contained in the authorization request message may be replaced or the account identifier may merely be amended to the authorization request message in addition to the second token.

In step 1111, the payment processing network server computer sends the payment authorization request message containing the account identifier to an account issuer server computer that is associated with the account identifier. The account issuer server computer may then process the transaction as a typical transaction. Accordingly, the account issuer may determine whether to approve or deny the transaction and would generate and send an authorization response message to the consumer returning the determination. Accordingly, because the account issuer may not know that the multiple tokenization authentication is occurring, the account issuer authorization response message may comprise the consumer's account identifier. As such, the payment processing network may receive the authorization response message and convert the account identifier back into a second token according to the reverse of the process detailed above. Furthermore, the merchant may convert the second token back into the first token and modify the authorization response message to protect the consumer's information.

Accordingly, the multiple tokenization authentication process may be used with existing payment transaction systems without requiring infrastructure upgrades. Accordingly, the first and second entities may implement both multiple tokenization authentication transactions as well as typical transactions on the same equipment. Accordingly, more flexibility is provided to transaction processing entities and infrastructure upgrade costs are minimized.

III. Technical Benefits

Embodiments of the invention provide the technical benefits of increased security and fraud reduction which result in conserved system resources and more efficient use of system resources. Embodiments of the present invention implement authentication techniques including multiple tokenization. A consumer provides a first token to a first entity which uses the first token to determine a second token. The second token may be generated using information contained in the first token or may be determined by searching a database for a second token that is associated with the first token.

In the case of the second token being generated using information contained in the first token, a first entity may not need to store any information about the consumer and may still authenticate the consumer for the transaction. Accordingly, vast system resources are saved by the lack of required storage. Additionally, the first entity does not have to expend system resources on securing any sensitive financial or personal information of the consumer. This leads to a more efficient authentication system because the authentication procedures are pushed to a second entity that may focus on data security and processing speeds instead of every first entity being forced to provide such capabilities. There may be many more first entities in a system than second entities and as such, the system may operate more efficiently by pushing sensitive data security to the second entity.

In the embodiment where the first entity determines a second token that is stored at the first entity and is associated with the first token, the first entity may not have to store any sensitive information about the consumer. Although, the first entity may store the second token, the second token may be unique to that first entity and thus may not be sensitive outside of the relationship between the first entity and the second entity. Furthermore, the information contained in the second token may be unrecognizable if it is generated from consumer information originally or may have no meaning outside of the relationship between the particular first entity and the second entity. Accordingly, multiple tokenization authentication provides a more efficient and secure system by not storing sensitive information at the first entity. Additionally, the second token may be stored in an encrypted manner that the first entity never gains access to. Furthermore, even if the second token were decrypted, the second token would be meaningless outside of the first entity so any malicious owner or employee of the first entity that gains access to the information, cannot initiate any transactions outside of the first entity.

Accordingly, embodiments of the present invention provide increased security from both malicious third parties as well as malicious owners, employees, or contractors of the first entity. Increased security leads to fewer fraudulent transactions being processed on a transaction processing system and thus less network wide traffic. This leads to more efficient use of system resources and savings in system infrastructure costs. Accordingly, embodiments of the present invention provide multiple technical benefits.

IV. Additional Embodiments

In other embodiments, an electronic wallet may be used to conduct a transaction. An electronic wallet may be used in a variety of transactions, including but not limited to eCommerce, social networks, money transfer/personal payments, mobile commerce, proximity payments, gaming, and/or the like. For example, consumers may engage in eCommerce via the electronic wallet for retail purchases, digital goods purchases, and utility payments. Consumers may also, for example, use the electronic wallet to purchase games or gaming credits from gaming websites, and transfer funds to friends via social networks. Further, for example, consumers may also use the electronic wallet on a smart phone for retail purchases, buying digital goods, NFC/RF payments at point of sale (POS) terminals.

In an exemplary transaction involving an electronic wallet, a consumer may submit an indication to purchase or transfer funds. For example, the consumer may visit a merchant website (e.g., Facebook.com, Amazon.com, etc.), and request to purchase an item from the website, transfer funds to a friend, and/or the like. The merchant website may determine whether the electronic wallet is authorized on its website, and may provide a list of payment options. If the merchant is registered with a electronic wallet server, the electronic wallet server may authorize the merchant to collect consumer credentials for login to the electronic wallet, and the merchant website may prompt the consumer to login to the electronic wallet. Otherwise, the merchant website may request the consumer to provide payment details for alternative payment options (e.g., credit card, debit card, PayPal account).

The consumer may authorize submission of their wallet consumer credentials, such as, but not limited to a Wallet/Consumer ID, a password, and/or the like. For example, the consumer may enter the Wallet/Consumer ID and password into a pop-up window provided from the merchant website and/or electronic wallet server. In another example, the consumer may authorize the merchant website to provide the consumer credentials (e.g., previously stored in HTML5, cookies, etc.), to the electronic wallet server. In yet another example, the consumer may authorize the electronic wallet server, via a remote component running on the merchant website (e.g., a Java applet, etc.) to provide consumer credentials to the electronic wallet server for validation.

When the consumer submits consumer credentials to log into the electronic wallet, the merchant website may forward the consumer credentials and transaction details to the electronic wallet server, which may determine the validity of the consumer credentials. If the consumer's credentials are not valid, the electronic wallet server may deny the payment request and send a notification of denial to the merchant website. In other embodiments, if the consumer provided credentials are valid, the electronic wallet server may process payment from the electronic wallet. For example, the electronic wallet server communicates with the consumer's bank account associated with the electronic wallet and requests a fund transfer of an indicated amount. The electronic wallet server may then store a transaction record.

In some embodiments, after processing the payment, the electronic wallet server sends a payment confirmation notice to the merchant website, which in turn completes the order and stores the transaction record in the database. The merchant website may provide a confirmation page comprising transaction confirmation to the consumer.

V. Exemplary Computer Apparatus

Figure 12:
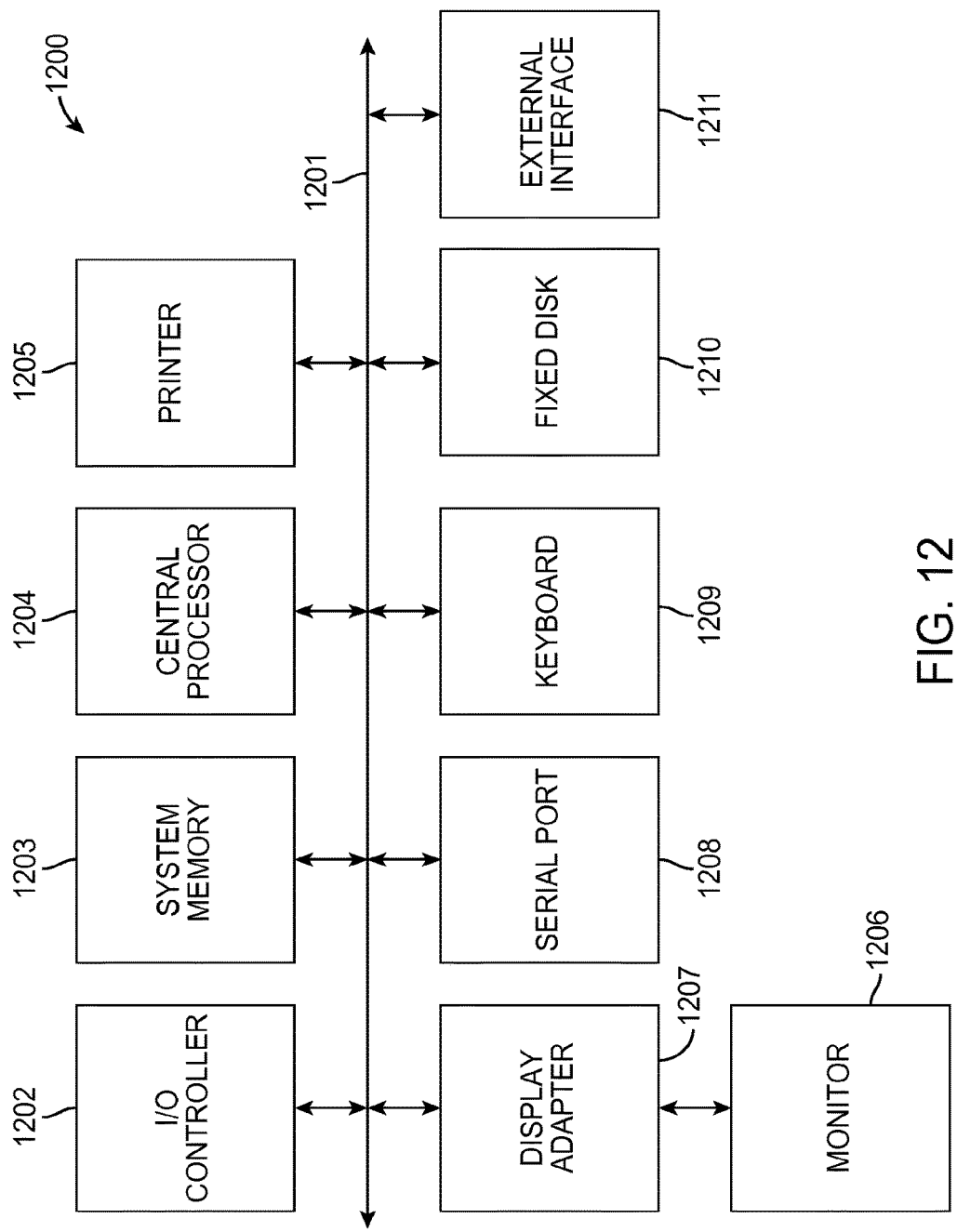
FIG. 12 depicts a block diagram illustrating an exemplary computer system according to one embodiment of the present invention.

The various participants and elements of the embodiments may operate one or more computer apparatuses to facilitate the functions described herein. Any of the elements in FIGS. 1-9 may use any suitable number of subsystems to facilitate the functions described herein. Examples of such subsystems or components are shown in FIG. 12. The subsystems shown in FIG. 12 are interconnected via a system bus 1201. Additional subsystems such as a printer 1205, keyboard 1209, fixed disk 1210 (or other memory comprising computer readable media), monitor 1206, which is coupled to display adapter 1207, and others are shown. Peripherals and input/output (I/O) devices, which couple to I/O controller 1202, can be connected to the computer system by any number of means known in the art, such as serial port 1208. For example, serial port 1208 or external interface 1211 can be used to connect the computer apparatus to a wide area network such as the Internet, a mouse input device, or a scanner. The interconnection via system bus allows the central processor 1204 to communicate with each subsystem and to control the execution of instructions from system memory 1203 or the fixed disk 1210, as well as the exchange of information between subsystems. The system memory 1203 and/or the fixed disk 1210 may embody a computer readable medium.

Other embodiments of the invention can also be contemplated.

One embodiment of the present invention may be directed to a method. The method comprising receiving at a first entity a first token from a consumer; determining a second token associated with the first token; and sending the second token to a sever computer at a second entity, wherein the first token is provided by consumer input through an access device. The first token may also be provided by a portable consumer device.

The method may further comprise receiving at the first entity a consumer identifier from the consumer; determining whether the first token is associated with the consumer identifier; and determining the second token associated with the consumer identifier only if the first token is associated with the consumer identifier. Lastly, the method may further comprise receiving, at the first entity, an authorization response message comprising the second token indicating whether the transaction is authorized.

Another embodiment of the present invention may be directed to an apparatus. The apparatus may comprise a processor and a non-transitory computer-readable storage medium coupled to the processor, the computer-readable storage medium comprising code executable by the processor for implementing a method. The method comprising receiving at a first entity a first token from a consumer; determining a second token associated with the first token; and sending the second token to a sever computer at a second entity, wherein the first token is provided by consumer input through an access device. The first token may also be provided by a portable consumer device. The method may further comprise receiving an authorization response message comprising the account identifier, wherein the authorization response message indicates whether the transaction is approved, modifying the authorization response message to remove the account identifier, and sending the authorization response message to the first entity.

Another embodiment of the present invention may be directed to a method. The method comprising providing a first token to a first entity, wherein the first token is used to determine a second token associated with the first token, and wherein the second token is sent to a server computer at a second entity.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention may, therefore, be determined not with reference to the above description, but instead may be determined with reference to the pending claims along with their full scope or equivalents.

What is claimed is:

1. A method comprising:
  receiving at a server computer, a modified first authorization request comprising an account number from a first processing computer, which determined the account number from an initial merchant token received in a first authorization request from a first merchant computer, which determined the initial merchant token from a consumer token;

transmitting, by the server computer, the modified first authorization request comprising the account number to an issuer computer, which approves or declines the modified first authorization request;

receiving, at the server computer, a modified second authorization request comprising the account number from a second processing computer, which determined the account number from a subsequent merchant token received in a second authorization request from a second merchant computer, which determined the subsequent merchant token from the consumer token; and transmitting, by the server computer, the modified second authorization request comprising the account number to the issuer computer, which approves or declines the modified second authorization request.

2. The method of claim 1 wherein the server computer is in a payment processing network and is configured to process credit and debit cards transactions.

3. The method of claim 1 wherein the consumer token is a phone number.

4. The method of claim 1 wherein the first and second authorization requests are ISO 8583 messages.

5. The method of claim 1, wherein the first processing computer is a first acquirer computer and the second processing computer is a second acquirer computer.

6. The method of claim 1, wherein the account number comprises 16 digits.

7. The method of claim 1, wherein the account number comprises 16 digits, and wherein the initial and subsequent merchant tokens are each 16 digits long.

8. The method of claim 7, wherein the initial and subsequent merchant tokens are different numbers.

9. The method of claim 7, wherein the first processing computer is a first acquirer computer.

10. The method of claim 9, wherein the second processing computer is a second acquirer computer.

11. The method of claim 1, wherein the consumer token is less secure than the initial merchant token, which is less secure than the account number.

12. The method of claim 1, further comprising:
deriving, by the first processing computer, the account number from the initial merchant token; and
deriving, by the second processing computer, the account number from the subsequent merchant token.

13. A system comprising:
a first processing computer;
a second processing computer; and
a server computer comprising
a processor, and
a computer readable medium coupled to the processor, the computer readable medium comprising code executable by the processor for implementing a method comprising
receiving a modified first authorization request comprising an account number from the first processing computer, which determined the account number received in a first authorization request from an initial merchant token from first merchant computer, which determined the initial merchant token from a consumer token,
transmitting the modified first authorization request to an issuer computer, which approves or declines the modified first authorization request,
receiving a modified second authorization request comprising the account number from the second processing computer, which determined the account number from a subsequent merchant token received in a second authorization request from a second merchant computer, which determined the subsequent merchant token from the consumer token and
transmitting the second authorization request to the issuer computer, which approves or declines the modified second authorization request.

14. The system of claim 13, wherein the consumer token is a phone number.

15. The system of claim 13, wherein the first and second authorization requests are ISO 8583 messages.

16. The system of claim 13, further comprising:
a token association database in communication with the server computer.

17. The system of claim 13, wherein the server computer comprises data processing subsystems and networks to deliver authorization services, exception file services, and clearing and settlement services.

18. A method comprising:
deriving, by a first processing computer, an account number from an initial merchant token specifically created for a first merchant;
receiving at a server computer, a first authorization request comprising the account number from the first processing computer;
forwarding, by the server computer, the first authorization request to an issuer;
deriving the account number, by a second processing computer, from a subsequent merchant token specifically created for a second merchant
receiving, at the server computer, a second authorization request comprising the account number from the second processing computer; and
forwarding, by the server computer, the second authorization request to the issuer;
wherein the initial merchant token and the subsequent merchant token were previously derived from a same consumer token.

* * * * *